United States Patent [19]

Nagashima

[11] Patent Number: 5,357,319
[45] Date of Patent: Oct. 18, 1994

[54] IMAGE FORMING APPARATUS HAVING IMAGE QUALITY CONTROL

[75] Inventor: Nao Nagashima, Tokyo, Japan

[73] Assignee: Canon Kabushiki Kaisha, Tokyo, Japan

[21] Appl. No.: 35,885

[22] Filed: Mar. 23, 1993

Related U.S. Application Data

[60] Continuation of Ser. No. 713,077, Jun. 11, 1991, abandoned, which is a division of Ser. No. 412,433, Sep. 25, 1989, Pat. No. 5,043,765, which is a continuation of Ser. No. 145,740, Jan. 19, 1988, abandoned, which is a continuation of Ser. No. 653,629, Sep. 24, 1984, Pat. No. 4,688,239, which is a continuation of Ser. No. 364,607, Apr. 1, 1982, abandoned, which is a continuation of Ser. No. 195,429, Oct. 9, 1980, abandoned.

[30] Foreign Application Priority Data

| Oct. 13, 1979 | [JP] | Japan | 54-132075 |
| Oct. 13, 1979 | [JP] | Japan | 54-132076 |
| Oct. 13, 1979 | [JP] | Japan | 54-132077 |

[51] Int. Cl.$^5$ .......................................... G03G 21/00
[52] U.S. Cl. .................................. 355/208; 355/214
[58] Field of Search .................... 355/208, 214, 219

[56] References Cited

U.S. PATENT DOCUMENTS

| 3,788,739 | 1/1974 | Coriale | 355/210 |
| 4,003,650 | 1/1977 | Courtney et al. | 355/219 X |
| 4,019,102 | 4/1977 | Wallot | 355/219 X |
| 4,167,325 | 9/1979 | Plumadore | 355/214 |
| 4,215,930 | 8/1980 | Miyakawa et al. | 355/208 |
| 4,248,519 | 2/1981 | Urso | 355/214 |
| 4,305,651 | 12/1981 | Umezawa et al. | 355/219 |

FOREIGN PATENT DOCUMENTS

| 2934337 | 2/1980 | Fed. Rep. of Germany . |
| 2039101 | 7/1980 | United Kingdom . |

Primary Examiner—Fred L. Braun
Attorney, Agent, or Firm—Fitzpatrick, Cella, Harper & Scinto

[57] ABSTRACT

An image recording apparatus for forming an image on a recording medium. The recording apparatus has a controller, which includes a detector for detecting a parameter affecting the quality of an image formed, and which is operable for automatically controlling variable operating conditions of a plurality of process units in accordance with the detected value of the parameter so as to regulate image quality. Manual selection is provided for selecting whether image formation is to be formed with or without the automatic control of the operating conditions by the controller.

7 Claims, 20 Drawing Sheets

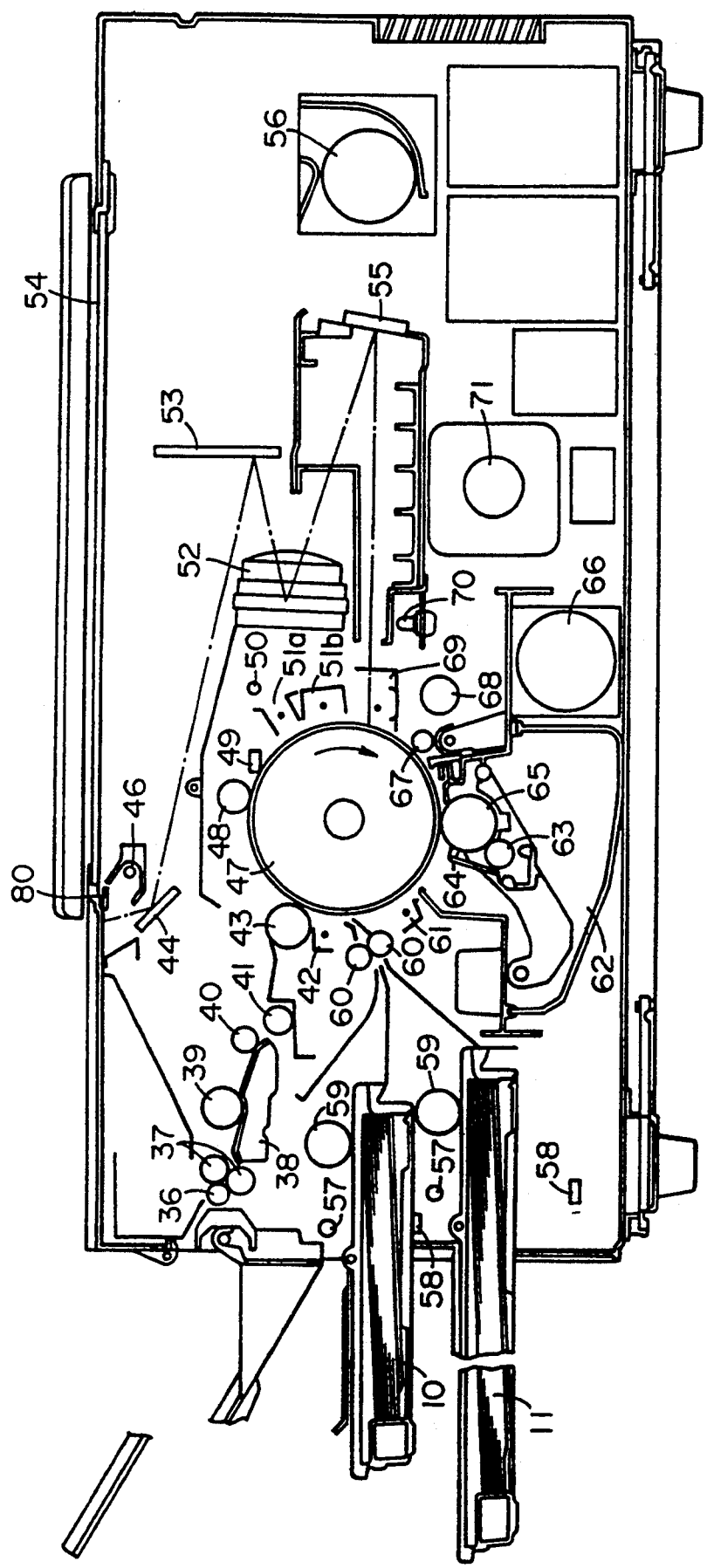
FIG. IA

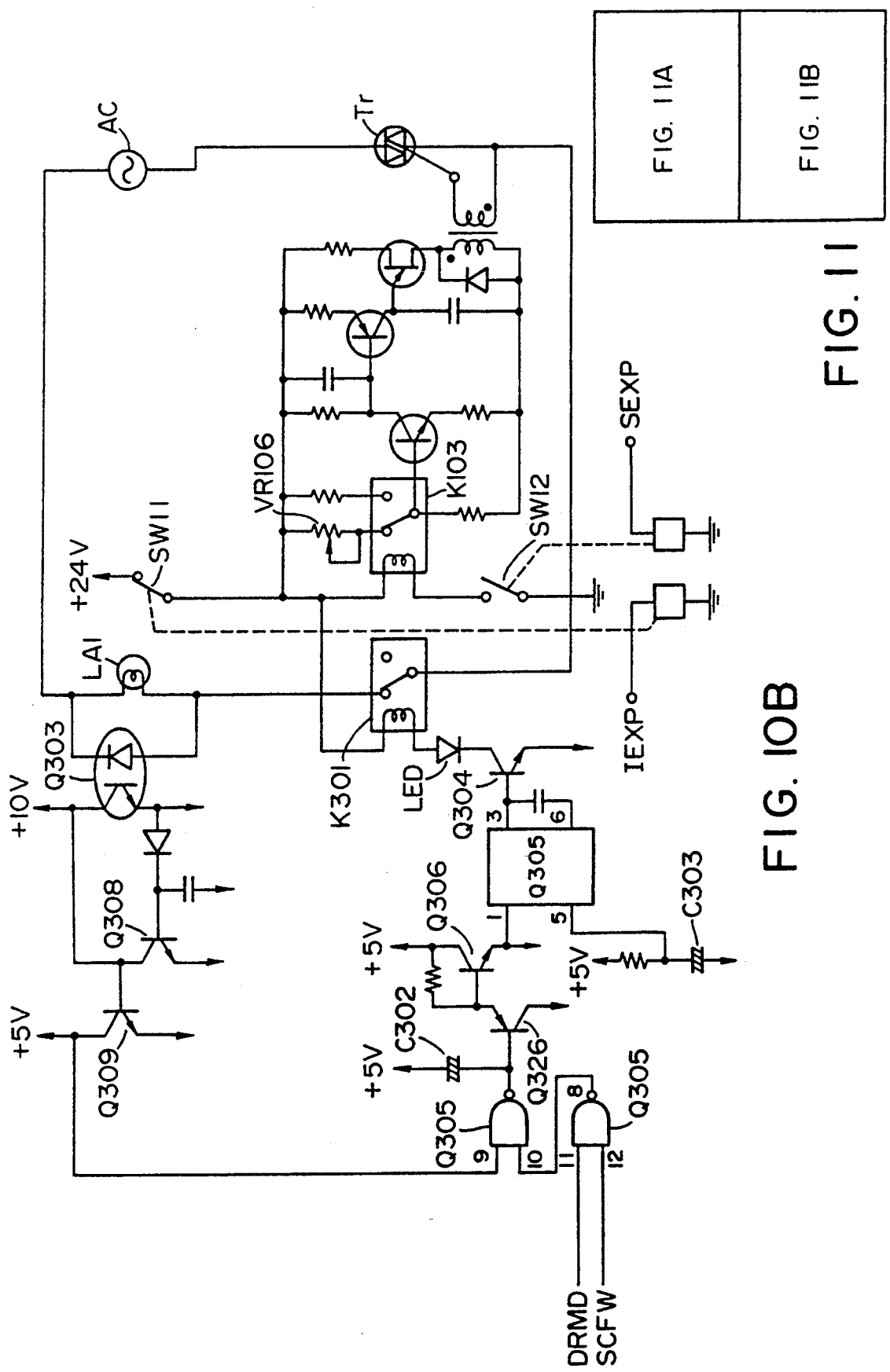

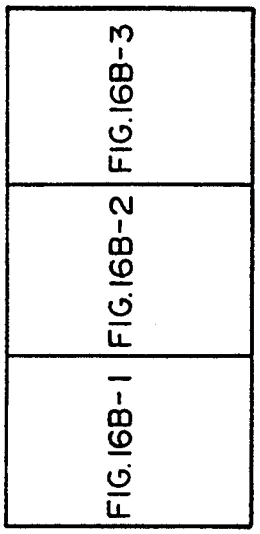
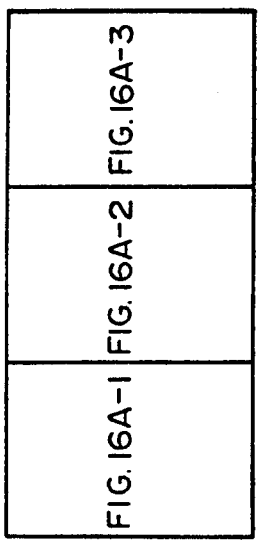
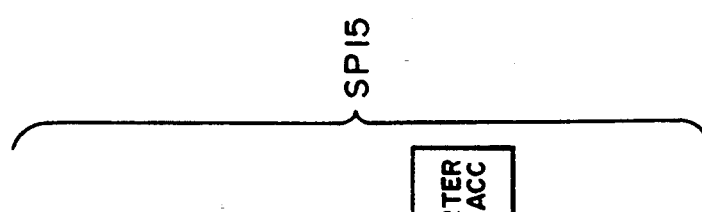
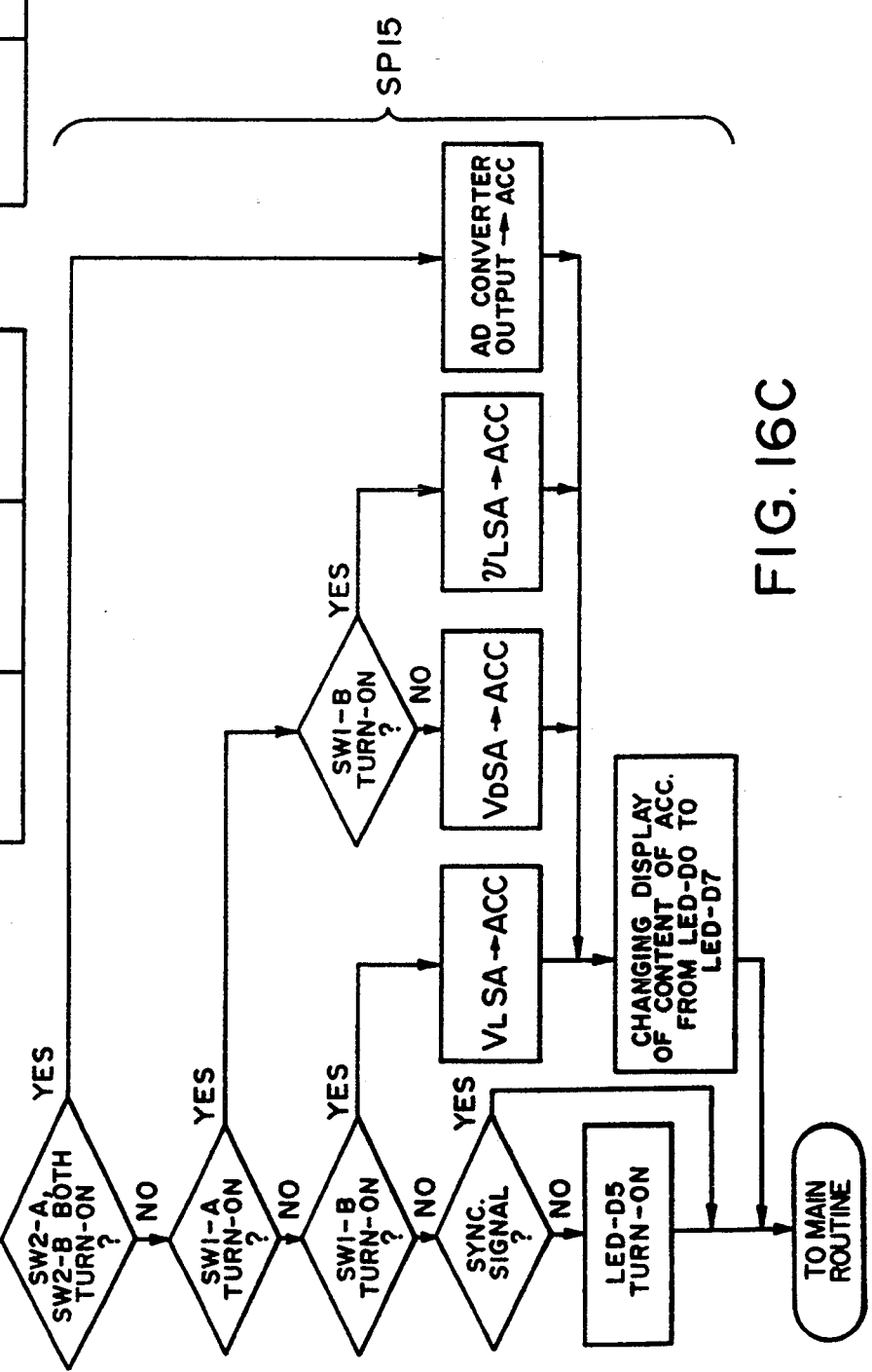

IMAGE FORMING APPARATUS HAVING IMAGE QUALITY CONTROL

This application is a continuation of application Ser. No. 07/713,077 filed Jun. 11, 1991, now abandoned, which is a division of application Ser. No. 07/412,433, filed Sep. 25, 1989 now U.S. Pat. No. 5,043,765, which is a continuation of application Ser. No. 07/145,740, filed Jan. 19, 1988, now abandoned, which is a continuation of application Ser. No. 06/653,629, filed Sep. 24, 1984, now U.S. Pat. No. 4,688,239 which is a continuation of application Ser. No. 06/364,607, filed Apr. 1, 1982, now abandoned, which is a continuation of application Ser. No. 06/195,429, filed Oct. 9, 1980, now abandoned.

BACKGROUND OF THE INVENTION

1. Field of the Invention

The present invention relates to an improvement in the image forming apparatus such as electrophotographic copier, and more particularly to an image forming apparatus in which the image formation is controlled by a digital computer.

2. Description of the Prior Art

In the conventional image forming apparatus it has been not possible to identify which parts of the image formation are controlled by the digital computer. Also there has been no effective method for identifying whether the digital computer is performing normal control in response to the input signals, or receiving normal input signals.

Also in the image forming apparatus in which the image formation is controlled by the output of an electrometer for measuring the surface potential of an electrostatic latent image formed on a recording member such as a photosensitive member or an insulating member, it has been necessary to use a voltmeter or the like for measuring the actual output of the electrometer.

SUMMARY OF THE INVENTION

In consideration of the foregoing, the object of the present invention is to provide an improvement in the image forming apparatus utilizing a digital computer for controlling the image formation.

Other objects of the present invention will become apparent from the following description of the embodiments thereof.

BRIEF DESCRIPTION OF THE DRAWINGS

FIG. 1A is a cross-sectional view of a copier in which the present invention is applicable;

FIG. 10B is a circuit diagram for controlling the intensity of the original illuminating lamp;

FIG. 11, comprising

FIGS. 16B-1, 16B-2 and 16B-3, and FIG. 16C are control flow charts of the computer CT7.

DESCRIPTION OF THE PREFERRED EMBODIMENTS

Figure 1B:
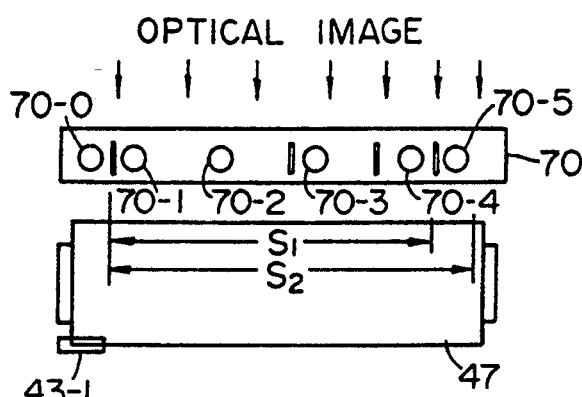
FIG. 1B is a plan view showing the vicinity of the blank exposure lamp 70 thereof.

Now the present invention will be explained in detail by an embodiment thereof wherein the present invention is applied to a copier having a surface electrometer.

FIG. 1A shows, in a cross-sectional view, a copier adapted for the present invention, in which a drum 47 peripherally provided with a three-layered seamless photosensitive member utilizing CdS photoconductive layer is rotatably supported on a shaft and is rotated in the direction of arrow by a main motor 71 to be started in response to the actuation of a copy key.

When the drum 47 is rotated by a determined angle, an original placed on a glass plate 54 constituting the original carriage is illuminated by an illuminating lamp 46 structured integral with a first scanning mirror 44, and the reflected light from said original is scanned by said first scanning mirror 44 and a second scanning mirror 53 which are so displaced at a speed ratio of $1:\frac{1}{2}$ as to maintain a constant light path length in front of the lens 52.

The reflected light is thus guided through a lens 52 and a third mirror 53 and is focused on the drum 47 in an exposure station.

The drum 47 at first receives charge elimination by simultaneous function of a pre-exposure lamp 50 and an AC pre-charger 51a, then is charged, for example positively, by a primary corona charger 51b, and is subjected to slit exposure, in said exposure station, of the image obtained by the illuminating lamp 46.

The drums is subjected, simultaneously with said image exposure, to charge elimination by an AC corona discharge or a DC corona discharge of a polarity opposite to that of the primary charging by means of a charge eliminator 69, and is then uniformly exposed to a whole-surface exposure lamp 68 to form an electrostatic latent image of an elevated contrast on the surface of said drum 47. Said latent image is then rendered visible as a toner image by liquid development conducted by a developing roller 65 in a developing station 62, and the toner image thus obtained is prepared for transfer by a transfer pre-charger 61.

A transfer sheet is supplied from an upper cassette 10 or a lower cassette 11 into the copier by a paper feed roller 59 and advanced by a register roller 60 towards the photosensitive drum 47 with such exact timing that the leading end of the transfer sheet coincides with that of the latent image at a transfer station.

The toner image on the drum 47 is transferred onto said transfer sheet during the passage thereof between the drum 47 and a transfer charger 42.

After the image transfer, the transfer sheet is separated by a separating roller 43 from the drum 47, then advanced to a feed roller 41, guided between a hot plate 38 and pressure rollers 39, 40 for fixing thus transferred image by means of heat and pressure, and is finally ejected to a tray 34 through an eject roller 37 and a paper detecting roller 36.

The drum 47 after said image transfer continues rotation, thus subjected to a surface cleaning step in a cleaning station composed of a cleaning roller 48 and an elastic blade 49, and proceeds to the succeeding imaging cycle.

A surface electrometer 67 for measuring the surface potential is provided between the whole-surface exposure lamp 68 and the developing station 62 and in the vicinity of the surface of said drum 47.

Prior to the above-mentioned imaging cycle there is effected a pre-wetting step in which, after the power supply is turned on, the liquid developer is poured to the cleaning blade 49 while the drum 47 is still stopped for the purpose of removing the toner deposited around said blade 49 and lubricating the contact between said blade 49 and the drum 47. After said pre-wetting (4 seconds) there is conducted a pre-rotation step INTR in which the drum 47 is rotated for removing the remaining charge and hysteresis by means of the pre-exposure lamp 50 and AC pre-charger 51a and for cleaning the drum surface by said cleaning roller 48 and cleaning blade 49, thereby achieving an appropriate sensitivity of the drum 47 and enabling image formation on a clean surface. The period of said pre-wetting step and the period or number of said pre-rotation are automatically regulated according to various conditions as will be explained later.

Also after the copying cycles of a pre-selected number, there is conducted a post-rotation step LSTR in which the drum 47 is rotated by several turns for removing the remaining charge and hysteresis and cleaning the drum surface by means of the AC charger 69 etc. thereby leaving the drum 47 in an electrostatically and physically cleaned state.

Figures 1, 16A:
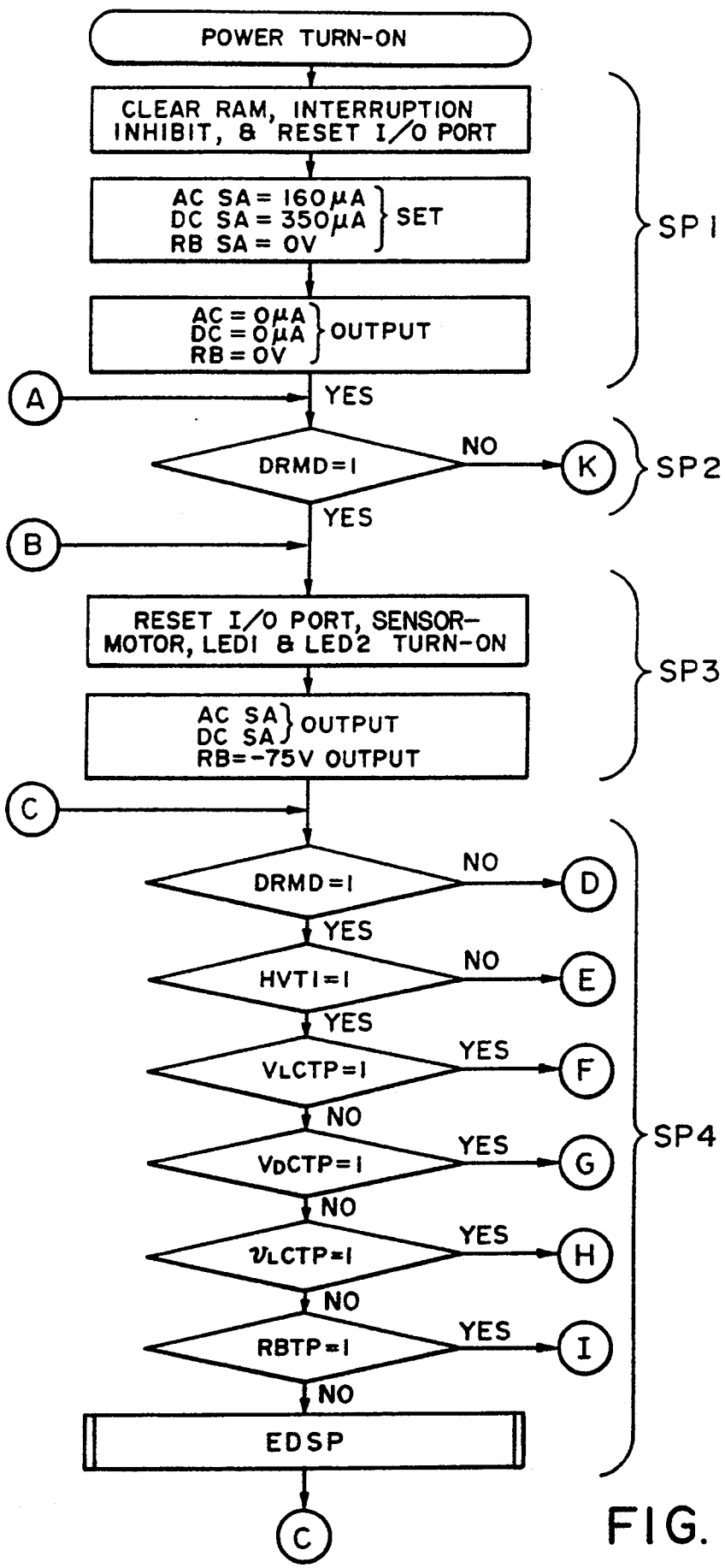
Figures 2, 16A:
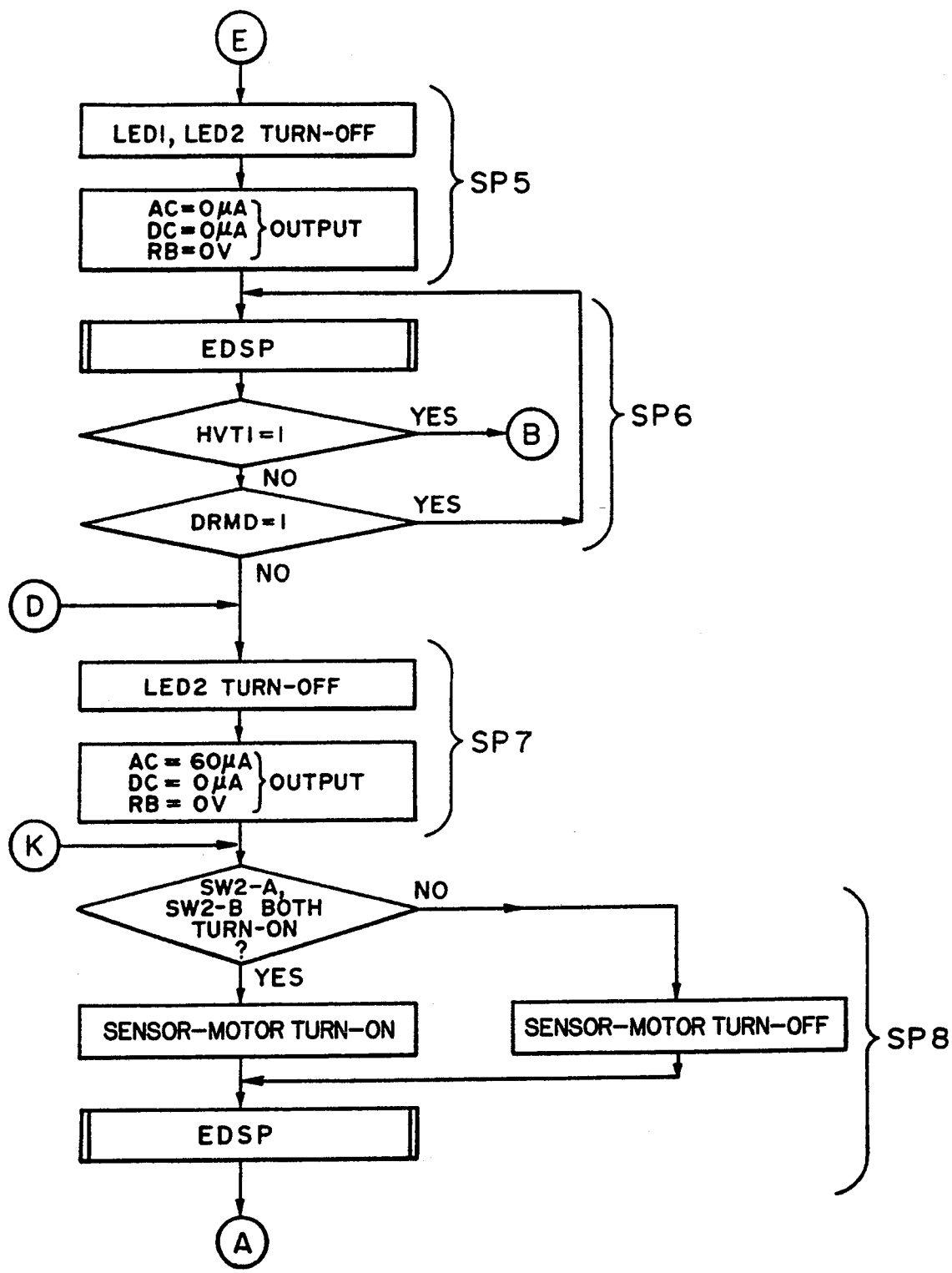
FIGS. 16A, comprising FIGS. 16A-1, 16A-2 and 16A-3, FIG. 16B, comprising
Figures 3, 16A:
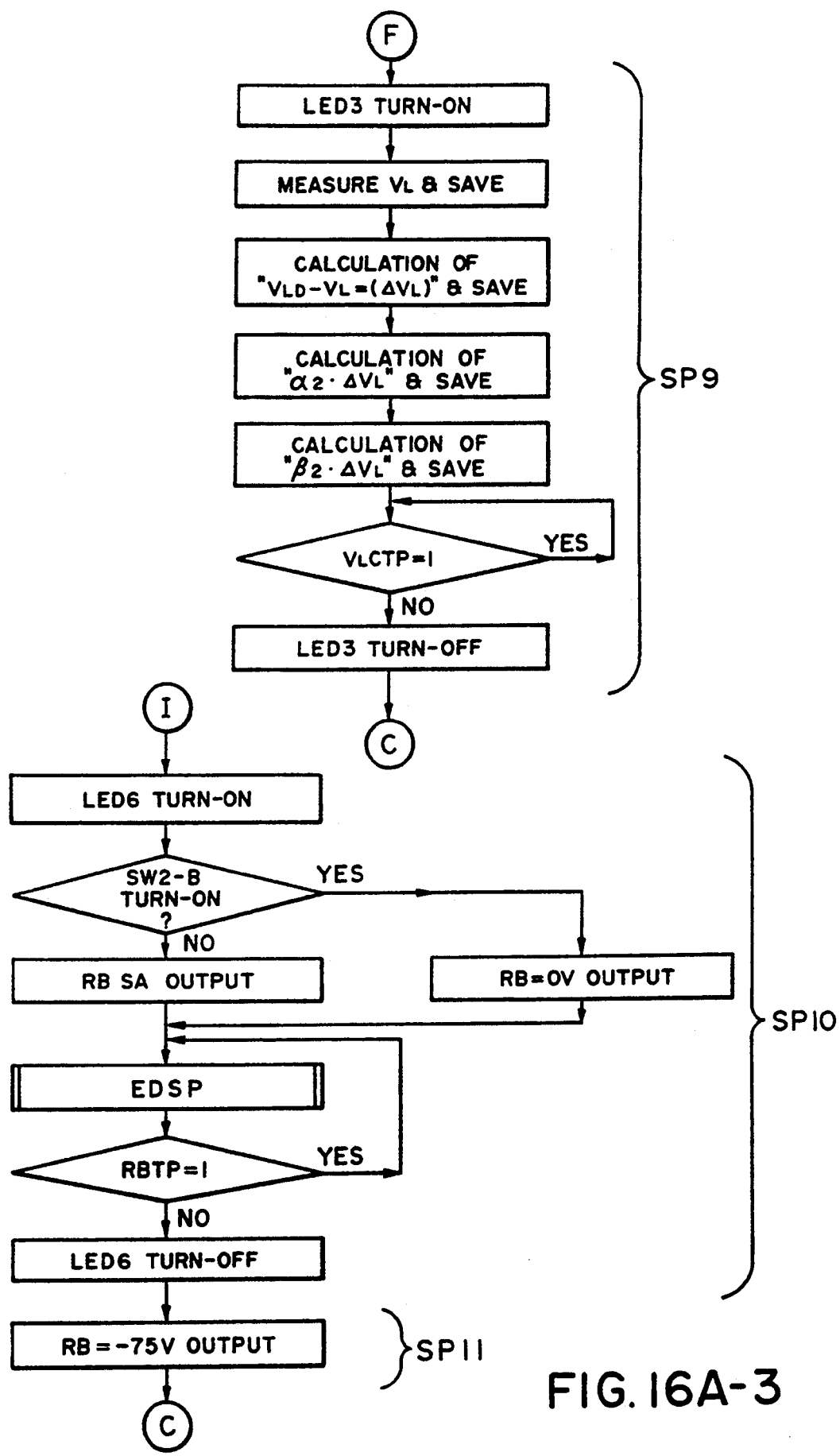

FIG. 1B shows, in a plan view, the arrangement of blank exposure lamps 70-1–70-5 shown in FIG. 1, which are lighted during the drum rotation except for the period of image exposure for eliminating the charge on the drum thereby preventing unnecessary toner deposition onto the drum. However the blank exposure lamp 70-1, positioned to illuminate a drum portion corresponding to the afore-mentioned surface electrometer 67, is momentarily extinguished at the measurement of dark potential by said electrometer. Also for a smaller copy size, for example B-series sizes, than A4 or A3 size, the blank exposure lamp 70-5 is lighted to illuminate the non-image area even during the image exposure. The lamp 70-0, called sharp-cut lamp, illuminates a drum portion coming into contact with a separating guide 43-1 to completely eliminate the charge in said portion thereby preventing stain by toner deposition in the non-image area utilized for sheet separation. Said sharp-cut lamp is constantly lighted during the drum rotation.

Figure 2:
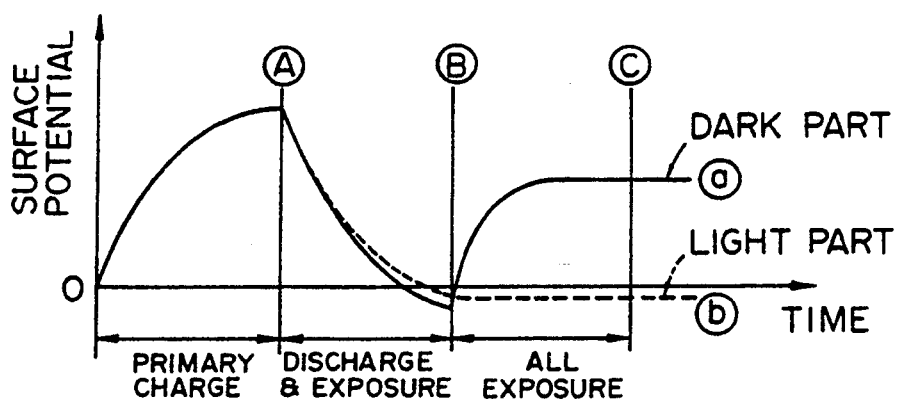
FIG. 2 is a chart showing surface potentials in different portions of the photosensitive drum.
Figure 3:
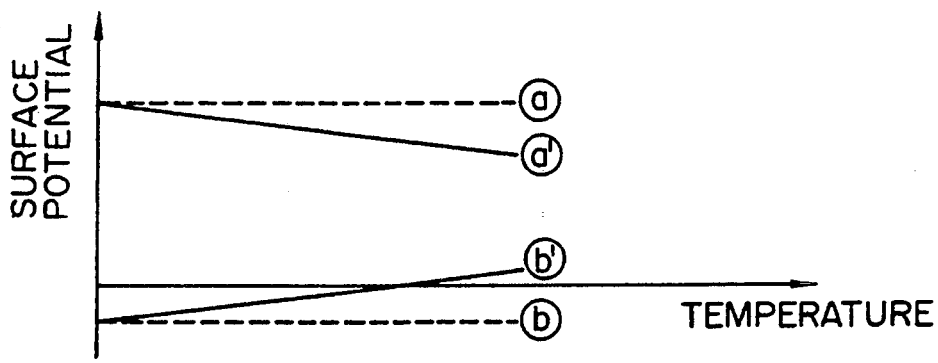
FIGS. 3 and 4 are charts showing the changes in the surface potential.
Figure 4:
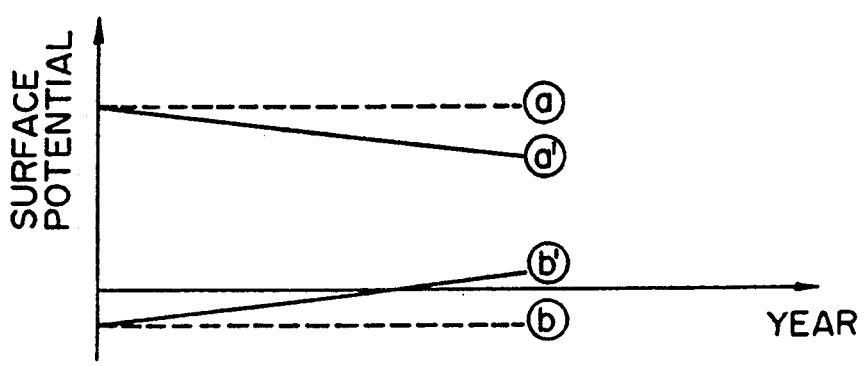

FIG. 2 shows the change of the surface potential of the photosensitive drum corresponding to a light area (with high light reflection) and a dark area (with low light reflection) of the original, in various steps of the copying process conducted in the above-explained electrophotographic copier. The final electrostatic latent image is represented by the surface potentials at the point C, but such surface potentials (a) and (b) respectively corresponding to the dark area and light area are subject to changes as shown by (a') and (b') in FIG. 3 by the rise in the circumferential temperature of the photosensitive drum 47 or in FIG. 4 by the time-dependent fatigue of the photosensitive drum, thus resulting in a loss in the image contrast.

In the following there will be explained a method for compensating the change in the surface potentials resulting from such temperature change or time-dependent fatigue.

Figure 5:
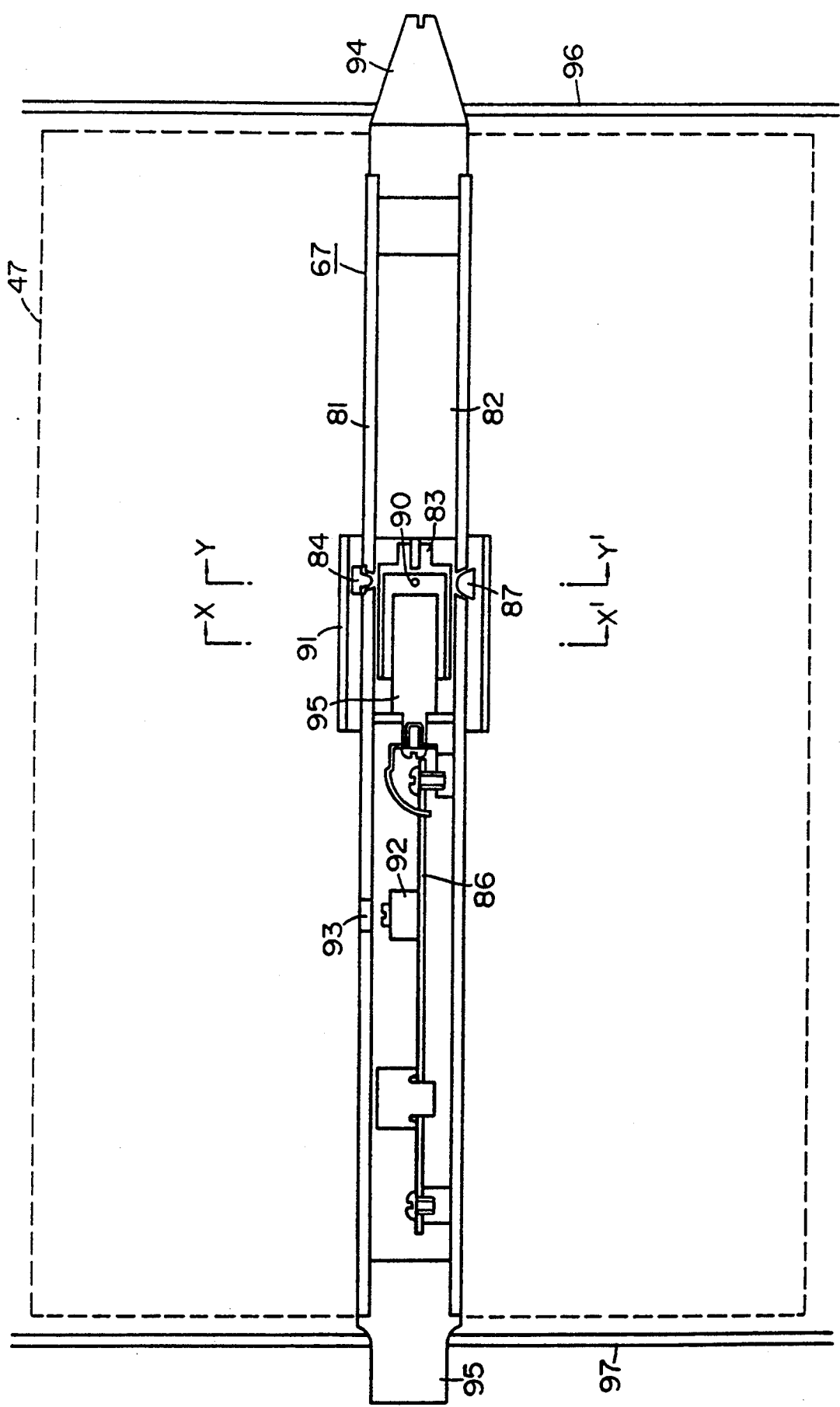
FIG. 5 is a longitudinal cross-sectional view of an electrometer.
Figure 6:
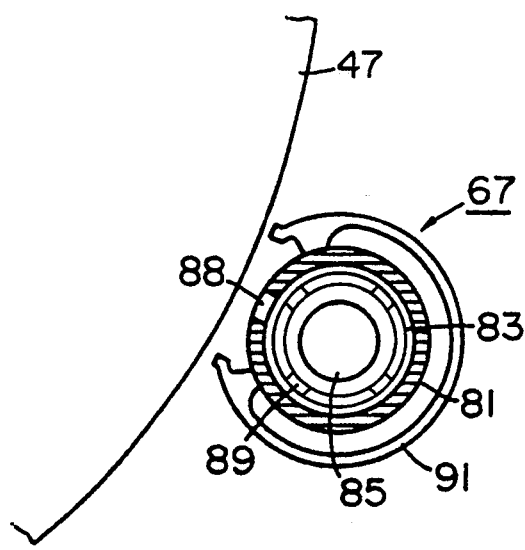
FIG. 6 is a cross-sectional view along the line X-X' in FIG. 5.
Figure 7:
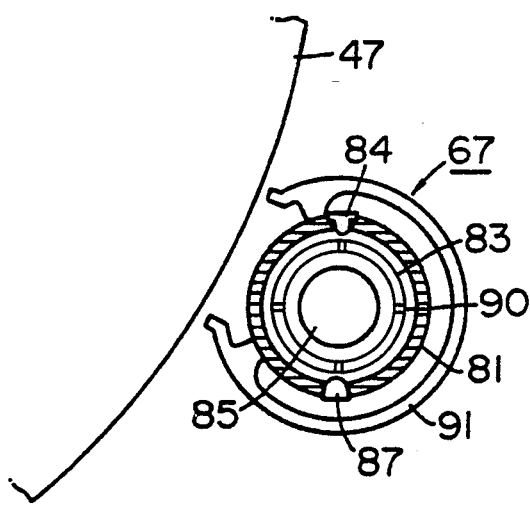
FIG. 7 is a cross-sectional view along the line Y-Y' in FIG. 5.
Figure 8:
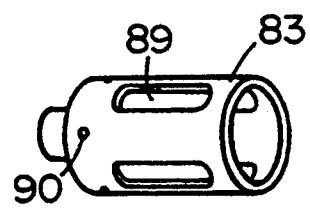
FIG. 8 is a perspective view of a cylindrical chopper.

At first an explanation will be given on the surface electrometer which is used for detecting the surface potential and which is shown in FIG. 5 in a lateral cross-sectional view, in FIG. 6 in a cross-sectional view along the line X–X' in FIG. 5 and in FIG. 7 in a cross-sectional view along the line Y–Y' in FIG. 5. Also FIG. 8 shows, in a perspective view, a chopper used as interrupting means to be explained later.

Referring to FIGS. 5, 6, 7 and 8, a brass outer cylinder 81 is provided with a surface charge detecting window 88. There are also shown a motor 82 for rotating a cylindrical chopper 83 provided with apertures 90 for transmitting the light of a light-emitting diode and windows 89 for potential measurement, a light-emitting diode 84, a surface charge measuring electrode 85, a printed preamplifier board 86 having a detecting circuit for detecting the output from said electrode 55, and a phototransistor 87.

The surface electrometer 67 is mounted at a distance of 2 mm from the drum surface of which surface potential is to be measured, in such a manner that the charge detecting window 88 faces said drum surface, and integrally incorporates therein the printed preamplifier board 86 for amplifying the voltage detected by said electrode 85.

In response to a sensor motor drive signal SMD supplied from an unrepresented control circuit, the motor 82 is energized to rotate the cylindrical chopper 83, whereby the charge on the drum induces a voltage on said electrode 85 through the potential measuring window 89.

The chopper 83 is provided with four measuring windows 89 at regular intervals and also with four light-transmitting apertures 90 positioned at regular intervals between said measuring windows 89. On said electrode 85 induced is an AC voltage because the rotation of chopper 83 shields the electrode 85 from the drum surface at regular intervals. The light from the light-emitting diode 84 is received by the phototransistor 87 to emit synchronizing signals when said chopper 83 shields the electrode 85 from the drum surface. A shielding member 91 is provided for preventing the entry of external light into the phototransistor 87 and of dust or toner particles into the interior of the electrometer, thus avoiding undesirable effect on the measurement.

A variable resistor 92, which is adjustable for example with a screw driver through an aperture 93, is provided for regulating the amplifying ratio of the amplifier provided on the printed circuit board 86, thus controlling the gain of the detection signal of the surface potential.

The surface electrometer 67 is structured somewhat longer than the drum 47, and is mounted on side boards 96, 97 for supporting the drum and other components by means of a conical front end portion 94 for centering and a rear end portion 95. Said side board 97 is rendered detachable.

Now there will be outlined the principle of surface potential control. In the present embodiment, the drum surface potentials in the dark area and light area are measured by using the blank exposure lamp 70 instead of the original illuminating lamp 46 shown in FIG. 1. More specifically the light and dark surface potentials are measured respectively on the drum surface illuminated and not illuminated by said blank exposure lamp 70.

The target values of the light potential $V_{L0}$ and dark potential $V_{D0}$ are to be selected for obtaining an appropriate image contrast, and are determined, in the present embodiment, as $-100$ V and $+475$ V, respectively. As the surface potentials are controlled in the present embodiment by the currents to the primary charger and the AC charger, there are correspondingly determined the target values of the primary charger current $I_{p1}$ and of the AC charger current $I_{AC1}$ so as to obtain the above-mentioned target light and dark potentials, said currents being equal to 350 μA and 160 μA respectively in the present embodiment.

The actual control is achieved in the following manner. From the light and dark potentials $V_{L1}$ and $V_{D1}$ measured for the first time, there are determined the difference voltages $\Delta V_{L1}$, $\Delta V_{D1}$ from the aforementioned target potentials $V_{L0}$, $V_{D0}$ as follows:

$$\Delta V_{L1} = V_{L0} - V_{L1} \tag{1}$$

$$\Delta V_{D1} = V_{D0} - V_{D1} \tag{2}$$

Though the light potential and the dark potential are respectively corrected by the AC charger and the primary charger, the regulation in AC charger in fact affects not only the light potential but also the dark potential. Also the regulation in the primary charger affect not only the dark potential but also the light potential. For this reason there is employed a correction method considering the effects of both the AC charger and the primary charger, and the amount of correction $\Delta I_{p1}$ in the primary charger current is represented by:

$$\Delta I_{p1} = \alpha_1 \cdot \Delta V_{D1} + \alpha_2 \cdot \Delta V_{L1} \tag{3}$$

wherein $A_1$ and $A_2$ are coefficients representing the change in the current of the primary charger corresponding to the changes in the surface potentials $V_D$, $V_L$ and are represented as follows:

$$\alpha_1 = \frac{\Delta I_P \text{ (change in primary charger current)}}{\Delta V_D \text{ (change in dark potential)}} \tag{4}$$

$$\alpha_2 = \frac{\Delta I_P \text{ (change in primary charger current)}}{\Delta V_L \text{ (change in light potential)}} \tag{5}$$

On the other hand the amount of correction $\Delta I_{AC1}$ in the AC charger current is represented by:

$$\Delta I_{AC1} = \beta_1 \cdot \Delta V_{D1} + \beta_2 \cdot \Delta V_{L1} \tag{6}$$

wherein the coefficients $\beta_1$ and $\beta_2$ can be represented as follows:

$$\beta_1 = \frac{\Delta I_{AC} \text{ (change in AC charger current)}}{\Delta V_D \text{ (change in dark potential)}} \tag{7}$$

$$\beta_2 = \frac{\Delta I_{AC} \text{ (change in AC charger current)}}{\Delta V_L \text{ (change in light potential)}} \tag{8}$$

Consequently the primary charger current $I_{p2}$ and the AC charger current $I_{AC2}$ after the first correction are represented as follows from (4), (5) and (1):

$$I_{p2} = \alpha_1 \cdot \Delta V_{D1} + \alpha_2 \cdot \Delta V_{L1} + I_{p1} \tag{9}$$

$$I_{AC2} = \beta_1 \cdot \Delta V_{D1} + \beta_2 \cdot \Delta V_{L1} + I_{AC1} \tag{10}$$

The coefficients $\alpha_1$, $\alpha_2$, $\beta_1$ and $\beta_2$ are determined in relation to the relevant charging conditions such as the circumferential temperature and humidity, status of the corona charger etc. However, since the target surface potentials may not be reached in one control due to the change in atmosphere or the fatigue of the charger, the measurement of the surface potentials is conducted plural times in a given state of the apparatus, and the control of the output of corona charger is likewise conducted the same number of times. As the correction of the 2nd time or thereafter is conducted in the same manner as in the 1st time, the currents $I_{Pn+1}$, $I_{ACn+1}$ of the primary charger and the AC charger after the n-th correction can be represented as follows:

$$I_{pn+1} = \alpha_1 \cdot \Delta V_{Dn} + \alpha_2 \cdot \Delta V_{Ln} + I_{Pn}$$

$$I_{ACn+1} = \beta_1 \cdot \Delta V_{Dn} + \beta_2 \cdot \Delta V_{Ln} + I_{ACn}$$

Figure 9A:
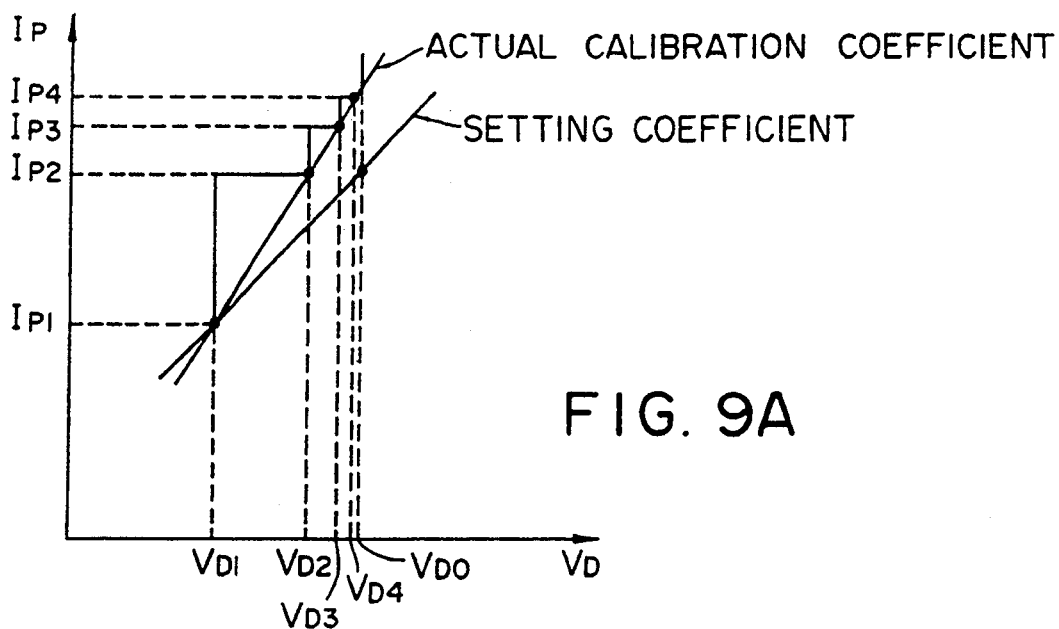
FIGS. 9A and 9B are charts showing the change in dark surface potential.
Figure 9B:
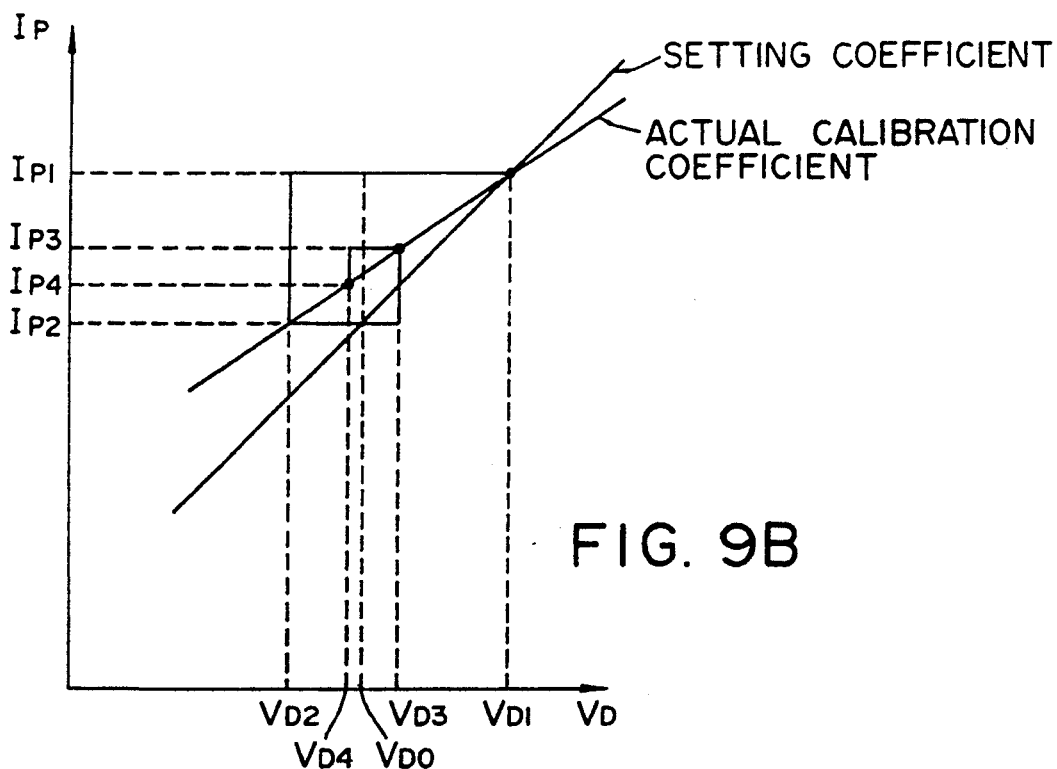

FIGS. 9A and 9B indicate the change in the dark potential in case the current $I_p$ of the primary charger is corrected three times, wherein FIG. 9A and FIG. 9B respectively show the cases in which the set calibration coefficients are smaller or larger than the actual coefficients.

In the present embodiment, the number of such corrections is determined as follows:

| Condition | | Number of corrections |
|---|---|---|
| State 1 | When copy start key is actuated within 30 seconds after the completion of preceding copying | 0 |
| State 2 | When copy start key is actuated within a period from 30 seconds to 30 minutes after the preceding copying | 1 |
| State 3 | When copy start key is actuated within a period from 30 minutes to 5 hours after the preceding copying | 2 |
| State 4 | When copy start key is actuated after more than 5 hours from the preceding copying or after the main switch is turned on | 4 |

In this manner it is rendered possible to realize stabilized surface potentials on the photosensitive member, while minimizing the loss in the copying speed.

In the state 1 the values of the controlled output currents for the primary charger and the AC charger in the preceding operation are memorized and used for controlling said chargers in the succeeding operation, while in the state 2 the same controlled output currents as in the preceding operation are given to the photosensitive member and the control is effected through the measurement of the surface potentials. Also in the state 3 the same controlled output currents as in the preceding operation are given to the photosensitive member for the detection of surface potentials, but the control is conducted twice in consideration of the longer time from the preceding control.

In the state 4 in which the time from the preceding control is much longer, the aforementioned standard currents $I_{p1}$ and $I_{AC1}$ are given in the first correction, and the control is effected four times.

Figure 10A:
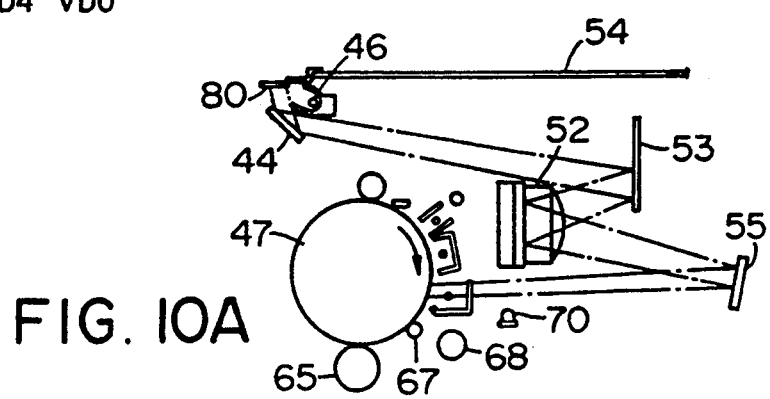
FIG. 10A is a schematic cross-sectional view of a copier showing the method of developing bias control.

In the present embodiment there is further effected the control of the developing bias voltage by a method shown in a schematic cross-sectional view of FIG. 10A.

Immediately prior to the original exposure, a standard white board 80 positioned at a side of the original carriage 54 is illuminated by the original illuminating lamp 46, and the reflected diffuse light is guided, through mirrors 44, 53, 55 and a lens 52 to the drum 47 to give a standard light amount. The amount of original exposure by the lamp displacement thereafter is changed to a value arbitrarily selected by the operator. The surface electrometer 67 measures the surface potential $V_L$ in the drum portion illuminated by said diffuse reflected light, and the developing bias voltage $V_H$ is determined higher than said measured voltage $V_L$ by 100 V.

Thus the toner assumes a potential substantially the same as said developing bias voltage $V_H$. In this manner, in case the standard light potential or the aforementioned measured potential is equal to $-100$ V, the toner assumes a potential of 0 V and is prevented from deposition on the drum. It is therefore rendered possible to prevent the background fog and to obtain stable images through constantly stable development.

Also in the present embodiment it is possible to obtain stable image even from the originals with colored background through adjustment of the light surface potential by the exposure since the standard light intensity is used only for illuminating the standard white board 80 corresponding to the white portion of ordinary originals and the actual original exposure is conducted with the light intensity selected arbitrarily by the operator.

The combination of the standard white board 80 and the original exposure lamp used in the determination of the developing bias voltage $V_H$ results in an improved precision of the developing bias control, and the loss in the copying speed is prevented because said control is effected immediately prior to the original exposure. Also stable images can be obtained without background fog even from the originals with colored background as the light intensity at the original exposure is changed to a value arbitrarily selected by the operator.

Figure 11A:
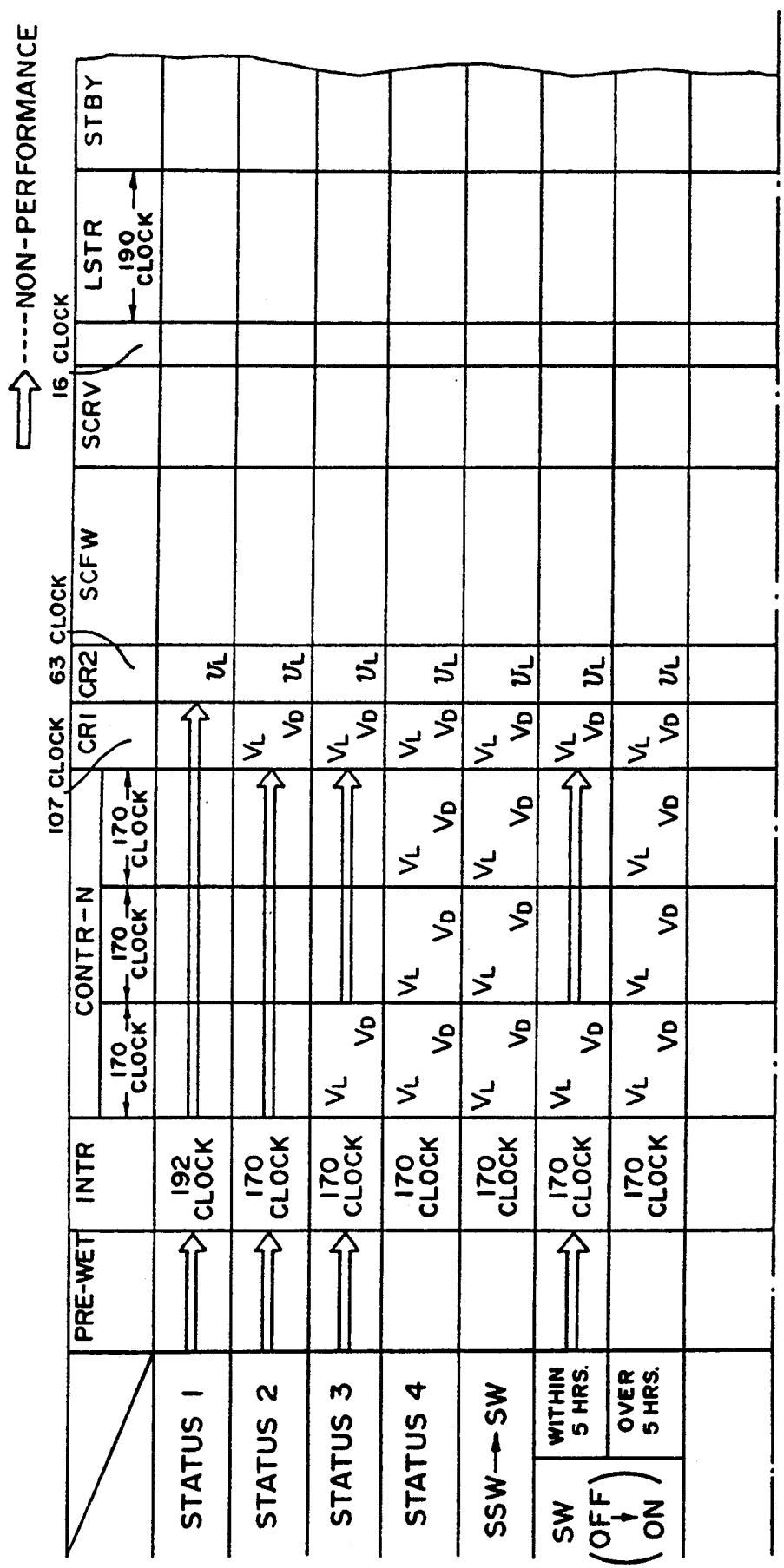
FIGS. 11A and 11B is a time chart for the image formation and surface potential control.
Figure 11B:
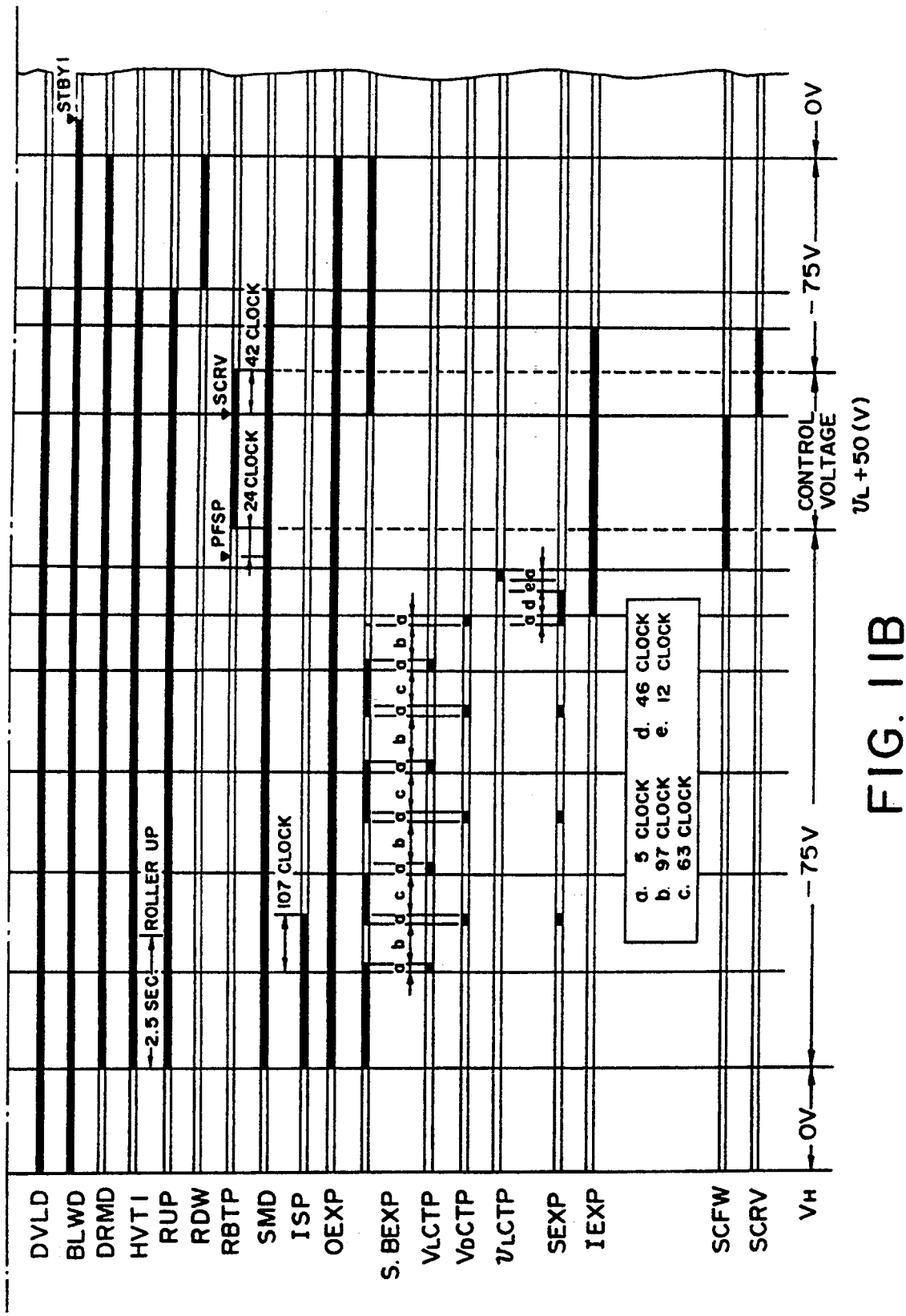

FIG. 11 shows a time chart of the image formation and the surface potential control explained in the foregoing.

In FIG. 11, INTR indicates a pre-rotation step for eliminating the retentive charge on the drum and thus adjusting the drum sensitivity, which is always effected prior to each copying operation.

CONTR-N indicates a drum rotation step for bringing the drum to a stationary state according to the preceding standstill time, wherein the surface electrometer measures the light potential $V_L$ and dark potential $V_D$ alternately in each turn of the drum and brings the surface potential to the target value through the function of a surface potential control circuit to be explained later. It is naturally possible also to conduct plural measurements of the potentials $V_L$ and $V_D$ in each turn.

CR1 indicates a drum rotation step in which the corona charger is controlled by the detection of the light potential $V_L$ and dark potential $V_D$ during 0.6 turns of the drum.

CR2 indicates a drum rotation step immediately preceding the copying operation, wherein the light potential is measured with the standard light intensity from the original illuminating lamp to determine the developing bias voltage. This step is always effected before each copying operation.

SCFW indicates a drum rotation step for copying, during which the optical system is put into forward displacement.

In the following there will be explained a circuit for realizing the surface potential control explained in the foregoing.

Figure 12:
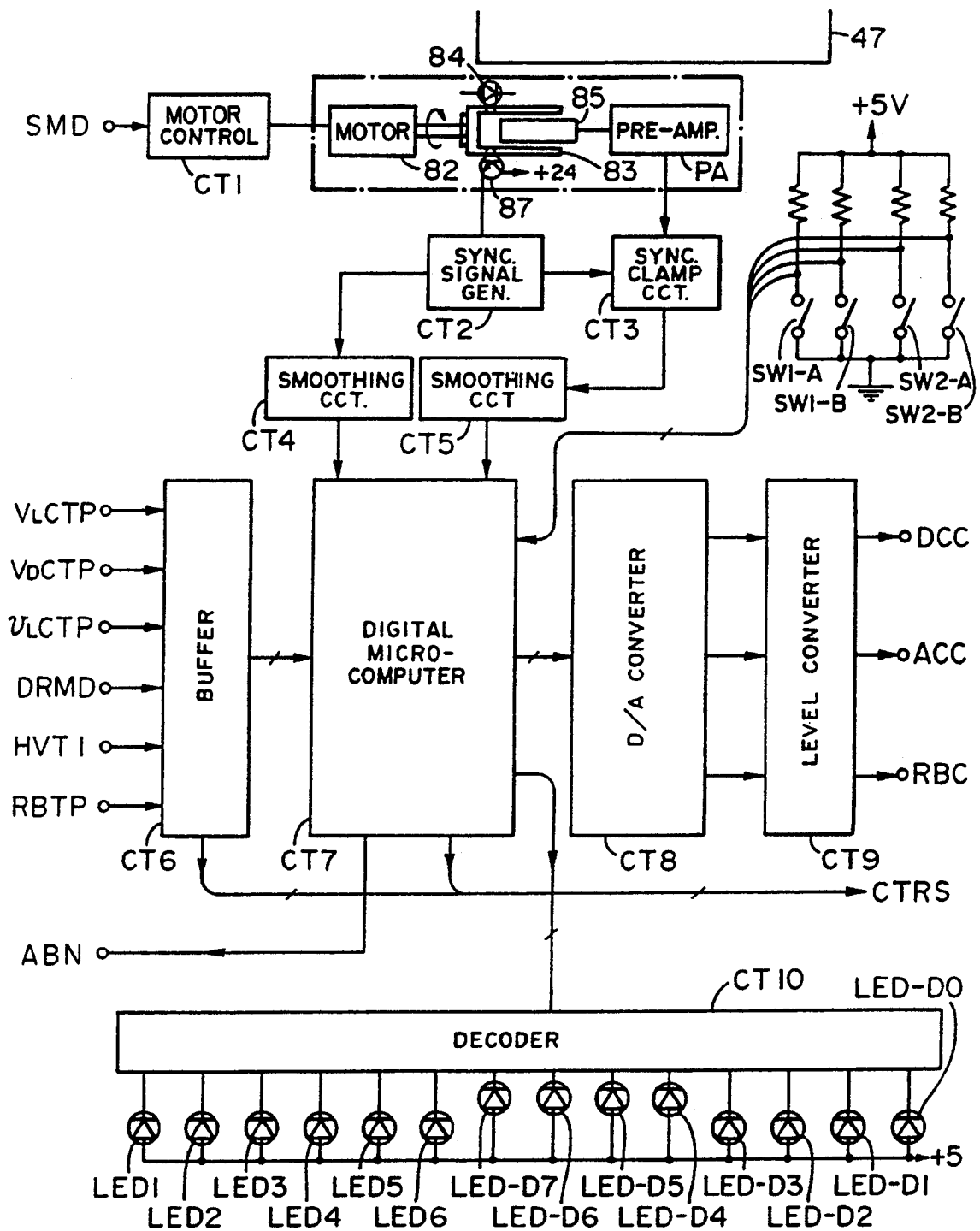
FIGS. 12 and 13 comprising
Figures 13, 13A:
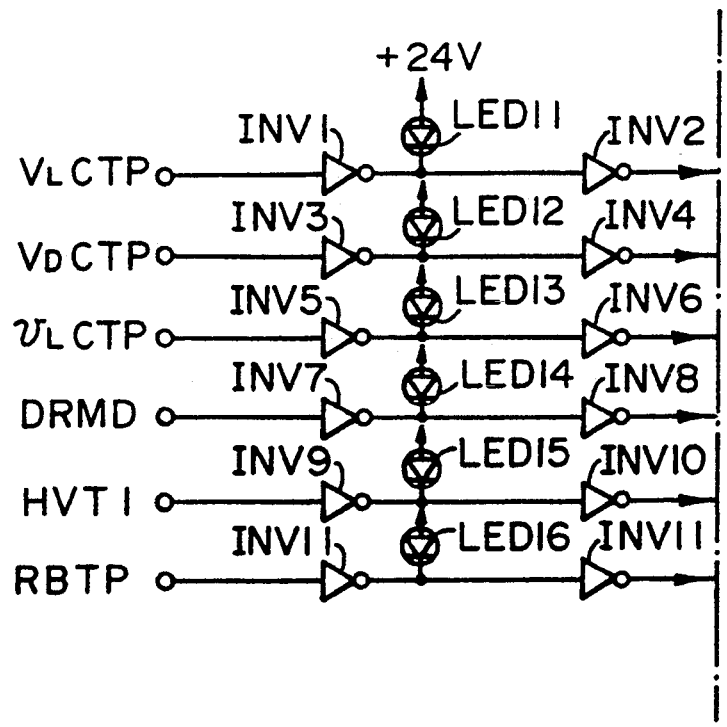
FIGS. 13A and 13B are block diagrams of the circuit for detecting and processing the surface potential.
Figure 13B:
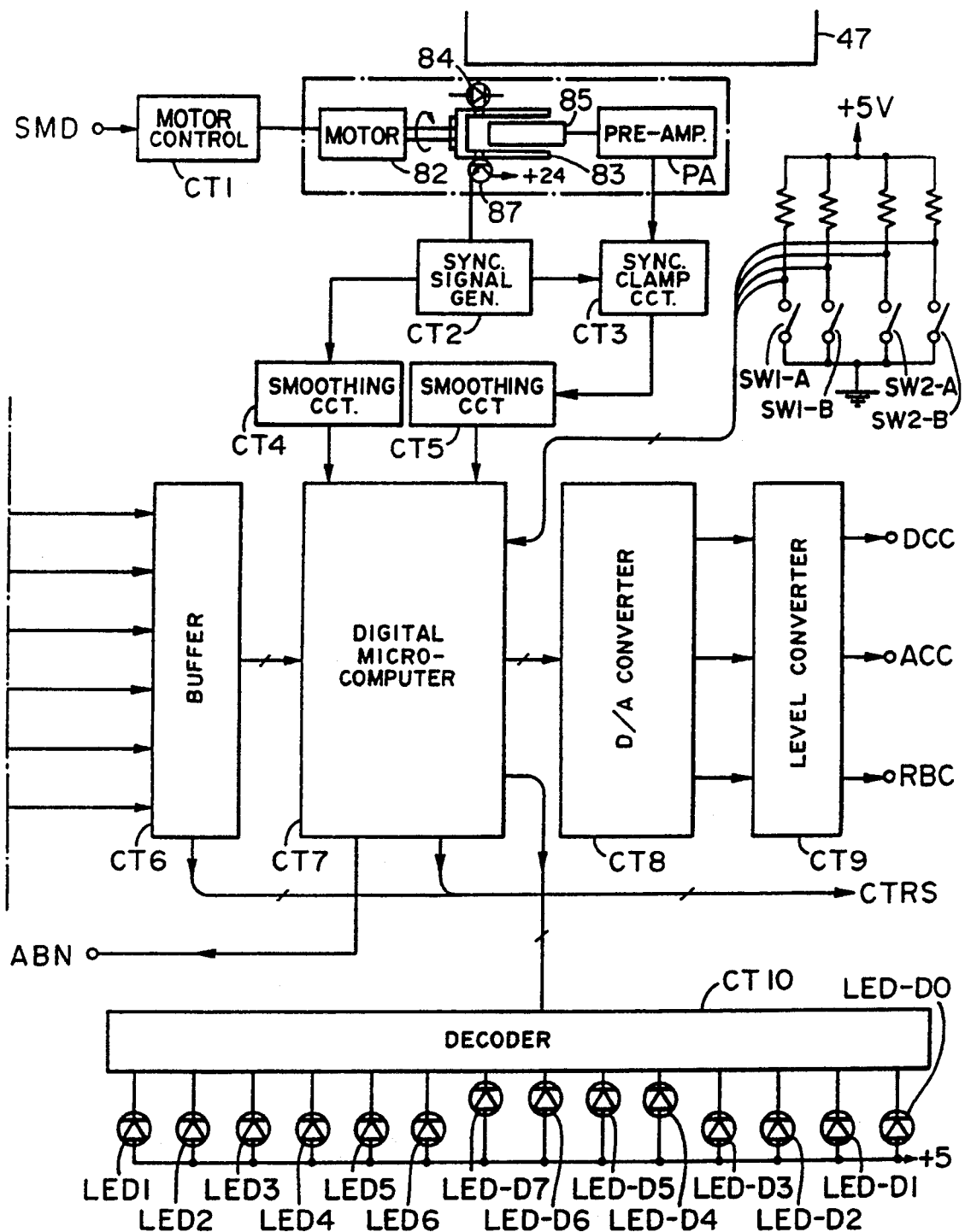
Figure 14:
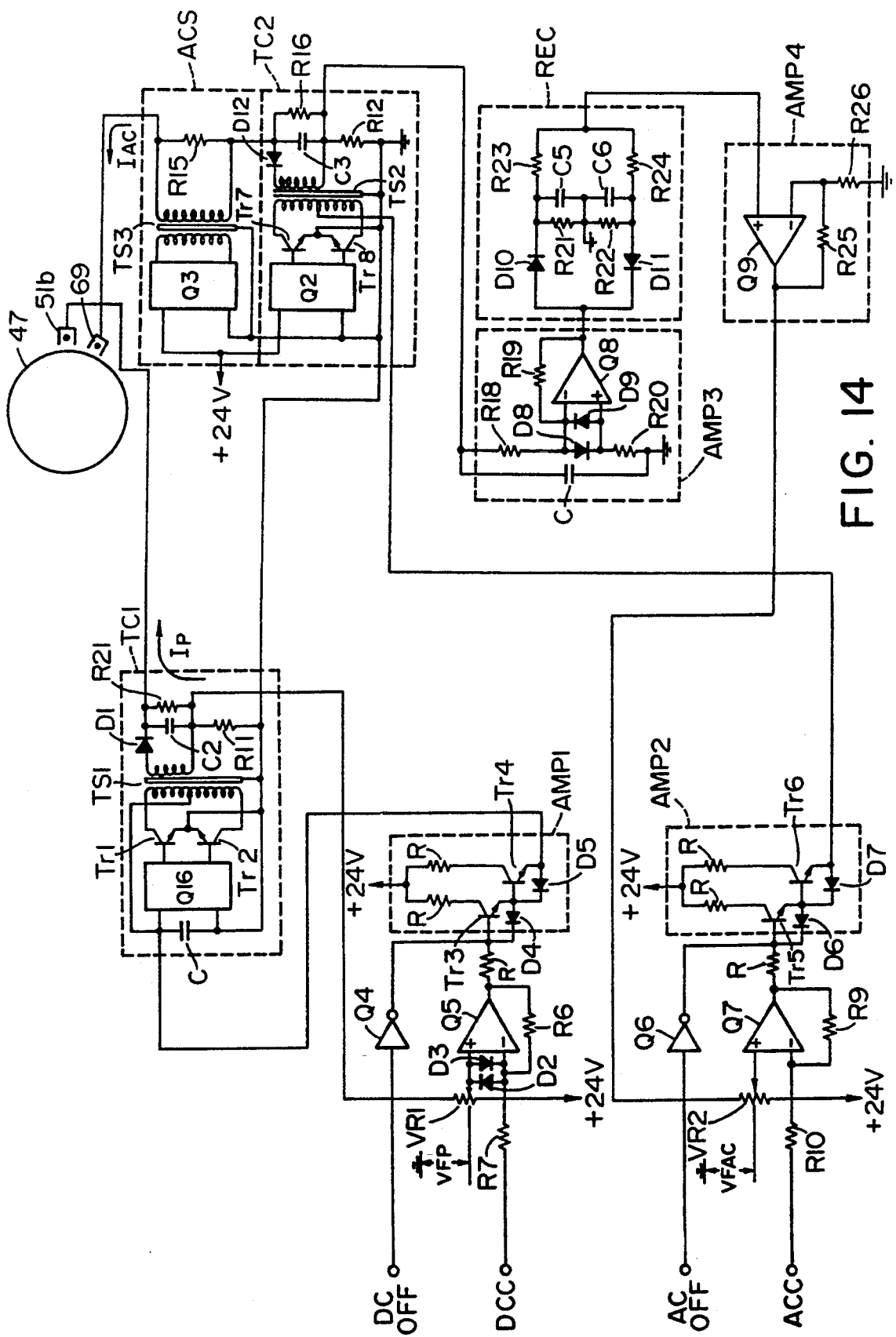
FIG. 14 is a circuit diagram for charger control.
Figure 15:
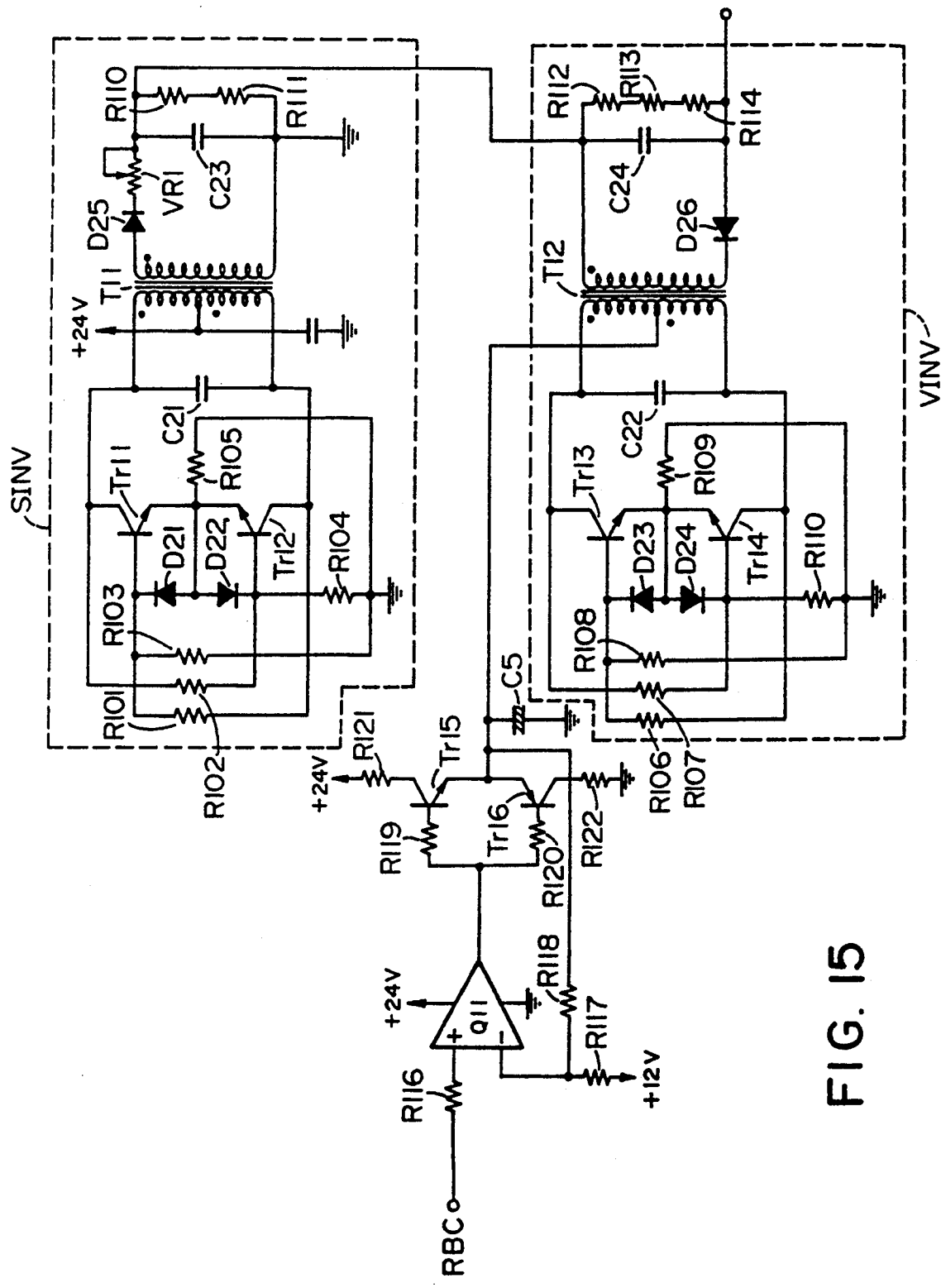
FIG. 15 is a circuit diagram for bias voltage.

FIGS. 12 and 13 show a circuit for detecting and processing the surface potential of the photosensitive drum 47, while FIG. 14 shows a circuit for controlling the primary charger and AC charger in response to the signals received from the circuit shown in FIGS. 12 and 13, and FIG. 15 shows a circuit for controlling the developing bias voltage in response to the signals received from the circuit shown in FIGS. 12 and 13.

The circuits shown in FIGS. 14 and 15 will not be explained in detail as such circuits are already disclosed detailedly in the preceding U.S. patent application Ser. No. 68,416 filed Aug. 21, 1979 by the present applicant.

In FIGS. 12 and 13 there are shown a motor control circuit CT1 for controlling the rotation of the motor 82 in response to the aforementioned sensor motor drive signal SMD; a synchronizing signal generating circuit CT2 for generating synchronizing signals from the combination of a light-emitting diode 84 and a phototransistor 87; a synchronizing clamp circuit CT3 for clamping the AC detection signals from a preamplifier circuit PA by the synchronizing signals from said circuit CT2; smoothing circuits CT4, CT5 for rectifying and smoothing the signals from said circuits CT2, CT3; a buffer circuit CT6 for receiving signals from an unrepresented DC controller for controlling the functions of the copying apparatus; and a digital microcomputer CT7 of 8 bits provided with an analog-digital converter and receiving the output signals from said buffer circuit CT6.

Also there are shown a digital-digital converter CT8 for converting the output signals from the microcomputer CT7 into analog signals; a level converting circuit CT9 for converting the levels of the output signals from said digital-analog converter CT8 and releasing a primary charger control signal DCC and an AC charger control signal ACC to the circuit shown in FIG. 14, and a developing bias control signal RBC to the circuit shown in FIG. 15; a display circuit CT10 for energizing light-emitting diodes LED1–LED6 and LED-D0–LED-D7 in response to the signals received from the microcomputer CT7; and switches SW1, SW2 for entering control information into said microcomputer CT7. In the circuit shown in FIG. 13 there are also provided light-emitting diodes LED11–LED16 for displaying the presence of the timing signal $V_DCTP$, $V_LCTP$, $v_LCTP$, DRMD, HVT1 or RBTP prior the entry thereof into the computer CT7.

Figures 1, 16B:
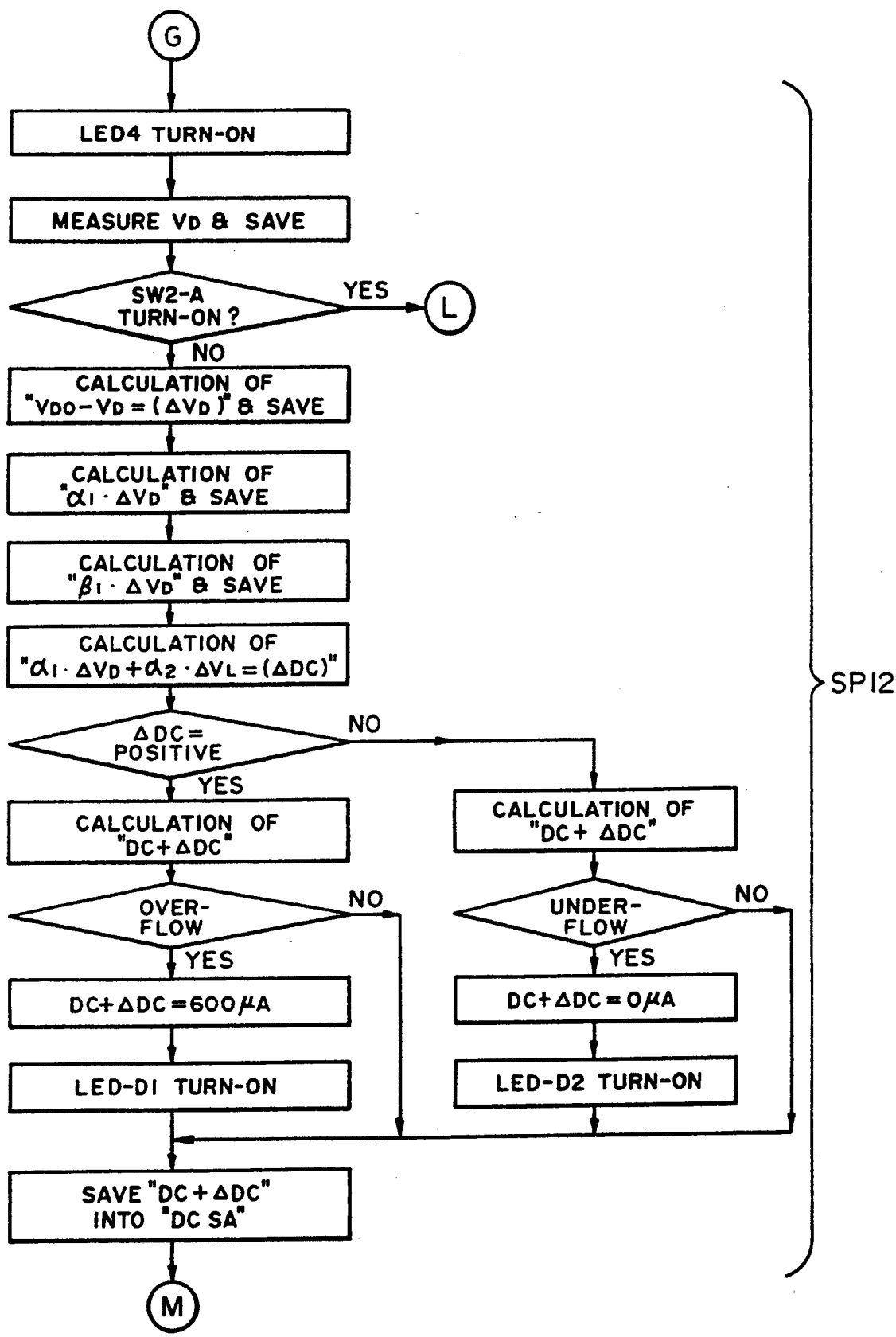
Figures 2, 16B:
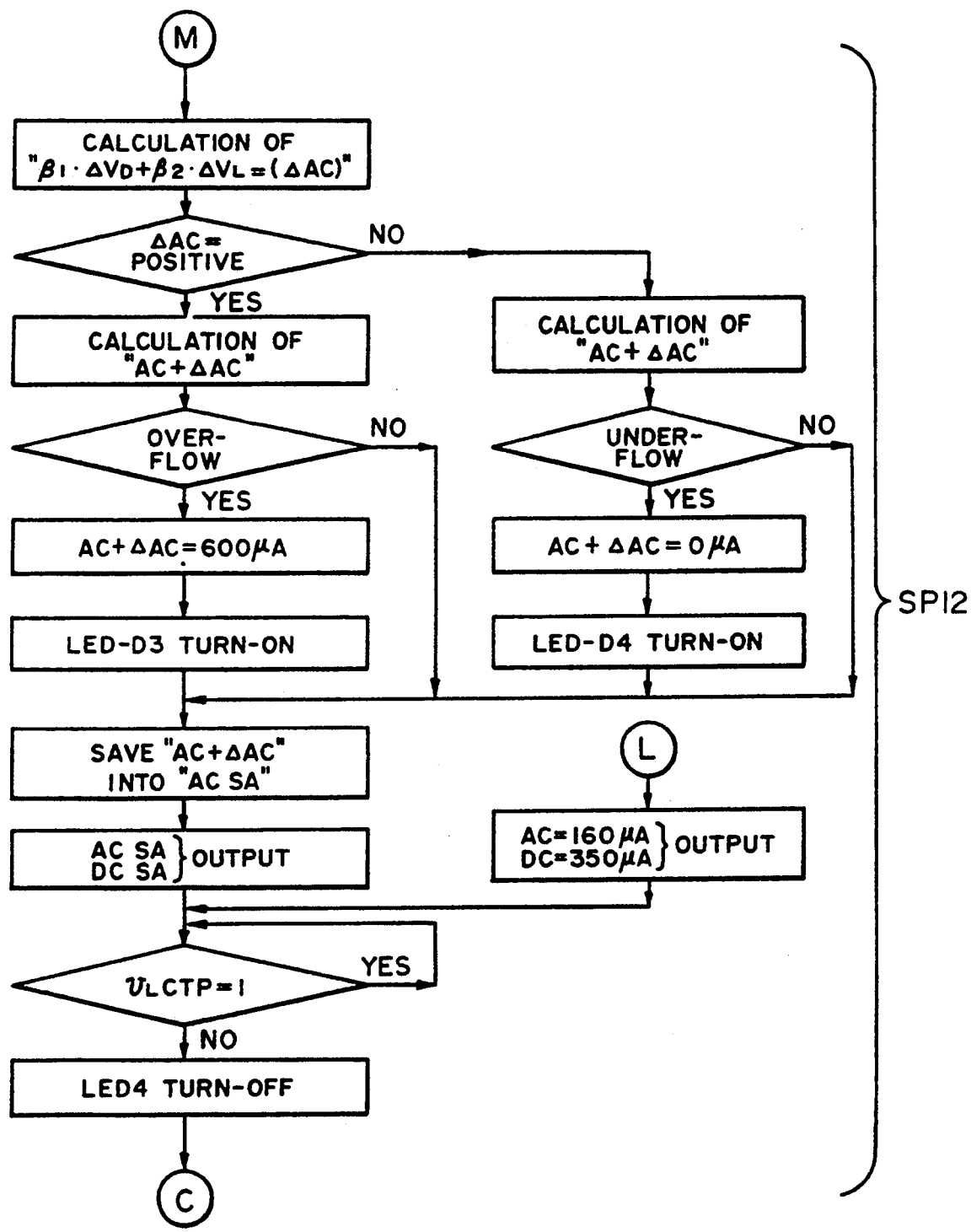
Figures 3, 16B:
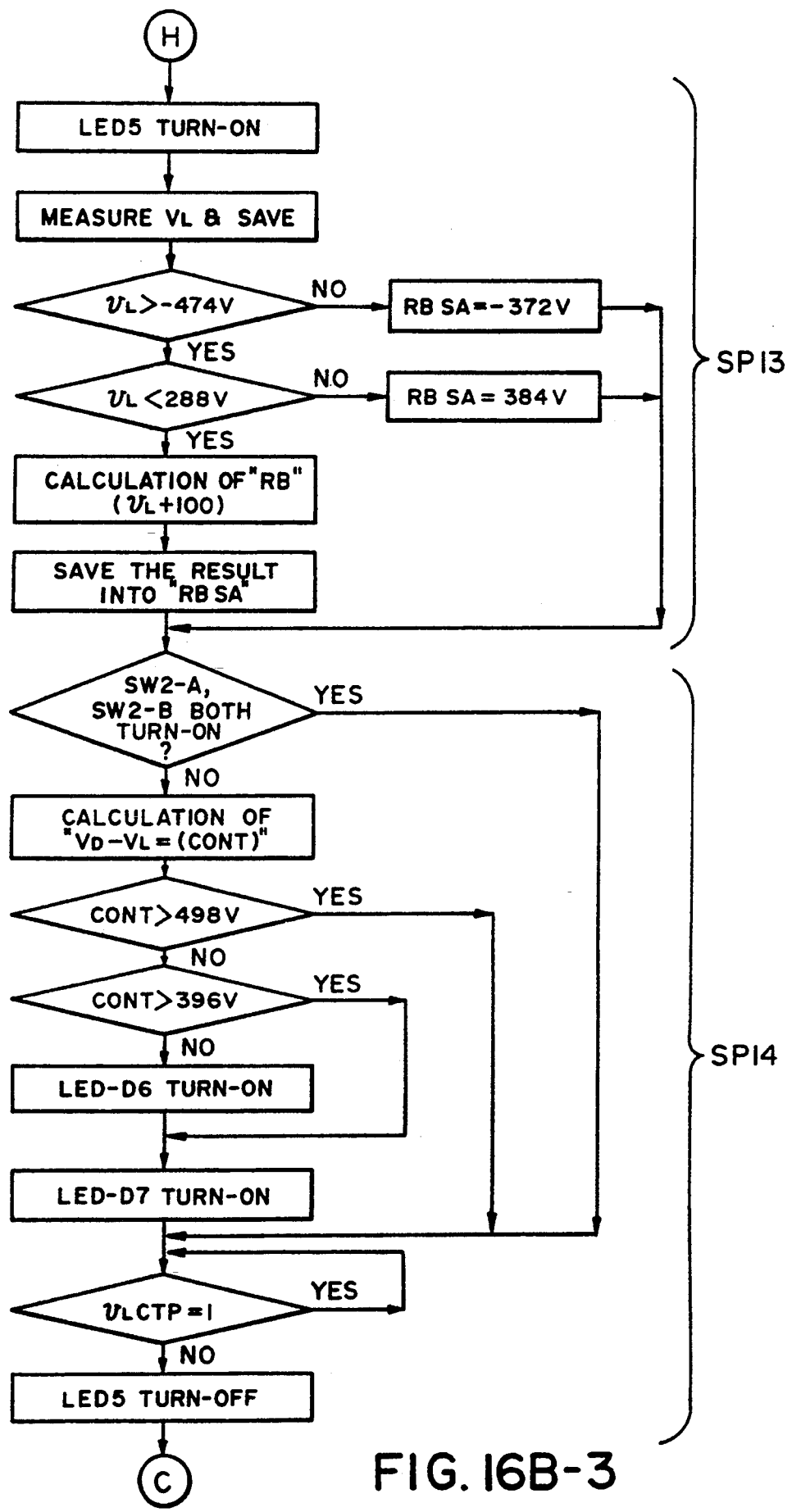

The microcomputer CT7 is provided therein with a program for effecting the aforementioned surface potential control, as shown in the flow charts of FIGS. 16A, 16B and 16C.

In said flow charts DC, AC and RB respectively indicate 8-bit digital values for controlling the primary charger, AC charger and developing bias. Also DCSA, ACSA and RBSA indicate the memory areas in the random access memory of the microcomputer CT7 for storing said digital values DC, AC and RB, respectively.

SP1 indicates a step for determining the initial values of the charger output and the developing bias when the power supply is turned on. Upon actuation of the copy button the main motor drive signal DRMD is shifted to the level-1 state, and the program proceeds from the step SP2 to step SP3. The signal HTV1 is shifted to the level-1 state simultaneously the shifting of said signal DRMD to the level-1 as shown in FIG. 11. Thus, in the step SP3 there are lighted the light-emitting diode LED1 indicating the level-1 state of the signal DRMD and the LED2 indicating the level-1 state of the signal HVT1, and the contents of the memory areas ACSA and DCSA are released.

The step SP4 inspects the entry of said timing signals DRMD, HVT1, $V_LCTP$, $V_DCTP$, $v_LCTP$ and RBTP in response to which the program proceeds to the corresponding tasks. In case the signal DRMD is shifted to level-0 then the signal HVT1 is also shifted to level-0, and the light-emitting diodes LED1, 2 are turned off in the step SP7. Also in case DRMD=1 and HVT1=0 indicating the post-rotation step LSTR, the light-emitting diode LED2 is turned off in the step SP5, and in case the signal HVT1 is shifted to level-1 before the signal DRMD is shifted to level-0, the program returns from the step SP6 to the point B. As mentioned before the light-emitting diodes LED1, 2 are turned off in the step 7 in case the signal DRMD is shifted to level-0.

Also in case the signal $V_LCTP$ is in the level-1 state in the step SP4, the program proceeds to the step TP9 for corresponding processing during which the light-emitting diode LED3 is turned on. Similarly in case the signal $V_DCTP$, $v_LCTP$ or RBTP is in level-1, the corresponding processing is effected in the step SP12, SP13 or SP14 respectively, during which the light-emitting diode LED4, LED5 or LED6 is turned on. The light-emitting diodes LED1–LED6 are related with the program steps as shown in the following table:

| Display LED | Corresponding input signal | Program steps when LED is turned on |
| --- | --- | --- |
| LED1 | DRMD | SP3, SP4, SP5, SP6, SP9, SP10, SP11, SP12, SP13, SP14 |
| LED2 | HVT1 | SP3, SP4, SP9, SP10, SP11, SP12, SP13, SP14 |
| LED3 | $V_LCTP$ | SP9 |
| LED4 | $V_DCTP$ | SP12 |
| LED5 | $v_LCTP$ | SP13, SP14 |
| LED6 | RBTP | SP10 |

In this manner it is rendered possible to know the program step in execution in the computer CT7 by means of the light-emitting diodes LED1–LED6 turned on. Also said light-emitting diodes LED1–LED6, which are turned on after the signal entry is confirmed by the software in the computer CT7, allow the confirmation of signal entry into the computer CT7 and of correct computer function. Besides, in case a display device is provided for confirming the signals prior to the entry into the computer as shown in FIG. 13, it is made possible, by comparing the display devices corresponding to each signals, to identify, in case of a trouble, if the computer is in malfunction or the input control signal is incorrect.

As shown in the step SP12, the light-emitting diode LED-D1 is turned on when the digital value DC for controlling the primary charger exceeds the controllable range. Similarly the LED-D2 is turned on when the digital value DC becomes lower than the controllable range. Likewise the LED-D3 or LED-D4 is turned on respectively when the digital value AC for controlling the AC charger is above or below the controllable range.

Also as shown in the step SP15, the light-emitting diode LED-D5 is turned on in the absence of the synchronizing signals from the electrometer 67, thus indicating the standstill state of the sensor motor.

Also as shown in the step SP14, the light-emitting diodes LED-D6 and LED-D7 are turned on in case the contrast CONT or the difference between the light potential $V_L$ and dark potential $V_D$ becomes less than 498 V and 396 V, respectively. The display light-emitting diode LED-D0 is provided as reserve. In this manner the light-emitting diodes in the present embodiment are employed for displaying the control state and the abnormal state.

In the circuits shown in FIGS. 12 and 13, there are provided switches SW1-A and SW1-B for reading the finally measured values of $V_L$, $V_D$ and $v_L$ from the corresponding memory areas in the microcomputer CT7 and displaying said value on the light-emitting diodes LED-D0–LED-D7 in 8-bit form. Said display is effected by the diodes LED-D1–LED-D7 when said switches SW1-A and SW-1B are both opened.

In case the switches SW1-A and SW1-B are respectively open and closed, the digital value of the light potential $V_L$ is read from the memory area in the computer CT7 and is displayed on the diodes LED-D0–LED-D7 in 8-bit form in the step SP15. Similarly the dark potential $V_D$ is displayed when the switches SW1-A and SW1-B are respectively closed and opened, and the standard light potential $v_L$ is displayed when both switches are closed.

Said display is conducted by a sub-routine EDSP provided in the steps SP4, SP6, SP8 and SP10 and in a signal waiting time.

The aforementioned digital computer CT7 can be composed of the one-chip microcomputer 8022 supplied by Intel Corp., the digital-analog converter CT8 can be composed of MN1204E supplied by Matsushita Electric Co., and the decoder CT10 can be composed of SN74154 supplied by Texas Instruments.

In the present embodiment, as explained in the foregoing, the output signals of the electrometer at different timings are converted into digital values by the analog-digital converter provided in the digital computer CT7, stored in said computer and selectively read by the switches to perform digital display by the light-emitting diodes. In this manner it is rendered possible to examine the measured potentials of different timings simply by operating the selecting switches and without using external measuring means such as a voltmeter and to easily achieve the trouble shooting in the apparatus having such potential detecting device.

For example in case the primary charger is in malfunction while other circuits are in normal state, the potentials $V_L$, $V_D$ and $v_L$ all become close to 0 V. Thus, such state, if found, can be identified as caused by the abnormality in the primary charger. Also the malfunction in the AC charger, whole-surface exposure lamp, original illuminating lamp or blank exposure lamp can be easily located by the respectively specific states of the potentials VL, $V_D$ and $v_L$.

A switch SW2-A selects whether the outputs of the primary charger and the AC charger are controlled by the detected surface potentials or are maintained at determined values regardless of the detected surface potentials, respectively in the opened and closed states thereof. Similarly a switch SW2-B selects the control by detected potential or the control at a determined value for the developing bias voltage, respectively in the opened and closed states thereof. Switch SW1-A and switch SW1-B may be operated independently from each other such that one switch may be in an open state while the other switch remains in a closed state.

However a potential measurement-display mode shown in the step SP15 is assumed when the switches SW2-A and SW2-B are both closed, wherein the result of measurement by the surface electrometer is converted into the digital value and directly displayed on the light-emitting diodes LED-D0–LED-D7.

Said mode is utilized for example calibrating the output gain from the surface electrometer 67, said calibration being conducted by mounting a simulating drum biased to a determined voltage on the copier instead of the photosensitive drum and regulating the aforementioned variable resistor 92 in such a manner that the value displayed on the light-emitting diodes LED-D0–LED-D7 coincides with the above-mentioned bias voltage. During this operation the program remains in the potential measurement-display mode by repeating the steps SP2 and SP8 due to the level-0 state of the signal DRMD.

In this manner it is rendered possible to achieve the adjustment of the electrometer as the measured potential can be easily verified without external measuring instrument. Also the increase in cost is minimized since the same display device is utilized both for the display of operation state and for the display of measured potentials, the latter being conducted only in a particular state.

It will be understood that the present invention is not limited to the foregoing embodiments but includes various modifications within the scope indicated in the appended claims.

What I claim is:

1. An image recording apparatus, comprising:
    image forming means, including a plurality of processing means, for forming an image on a recording medium;
    control means, said control means including detecting means for detecting parameters effecting the quality of an image formed by said image forming means, wherein said control means is operable for automatically controlling a plurality of variable operating conditions of said plurality of processing means in accordance with the detected value of said parameter so as to regulate image quality; and
    selecting means for manually selecting whether to perform image formation using the automatic control of said operating conditions, based on the detected parameter values by said control means,
    wherein said detecting means further comprises a plurality of manual switching means independently operable to control whether image forming conditions associated with each manual switching means should be performed with or without automatic control of said operating conditions, and wherein in the case said selecting means selects the image formation without automatic control, one of said plurality of manual switching means operates to set at least one of the operating conditions to a predetermined value, and another of said plurality of manual switching means operates to set at least another of the operating conditions in accordance with the detected value of said parameter.

2. An image recording apparatus according to claim 1, wherein said control means is operable in response to selection by said selecting means of image formation without automatic control, to set said operating conditions each according to a predetermined value.

3. An image recording apparatus according to claim 1, wherein said parameter is a surface condition of said recording medium.

4. An image recording apparatus according to claim 1, wherein said plurality of processing means includes a photosensitive member, charging means for charging said photosensitive member, and developing means for developing a latent image on said photosensitive member.

5. An image recording apparatus, comprising:
    image forming means, including a plurality of processing means, for forming an image on a recording medium;
    detecting means for detecting a parameter affecting the quality of an image formed by said image forming means;
    control means, which has an automatic control mode for automatically controlling a plurality of variable operating conditions of said plurality of processing means based on the detected parameter values of said detecting means, and a non-automatic control mode for individually controlling the plurality of variable operating conditions of said plurality of processing means based on the respective specified values regardless of the detected parameter values of said detecting means, for outputting control signals so as to individually control said plurality of processing means; and
    selecting means for manually selecting, for each said processing means, whether to perform the automatic control mode or the non-automatic control mode,
    wherein said control means is operative for each said processing means in the automatic control mode or the non-automatic control mode in accordance with the selection of said selecting means.

6. An image recording apparatus according to claim 5, wherein said plurality of processing means includes a photosensitive member, charging means for charging said photosensitive member, and developing means for developing a latent image on said photosensitive member.

7. An image recording apparatus according to claim 2 or claim 5 wherein said parameter is a surface condition of said recording medium.

* * * * *